(12) United States Patent
Liu et al.

(10) Patent No.: US 8,711,119 B2
(45) Date of Patent: Apr. 29, 2014

(54) DISPLAY SYSTEMS WITH TOUCH SCREENS

(75) Inventors: Da Liu, Milpitas, CA (US); Horia Udrea Spenea, Santa Clara, CA (US)

(73) Assignee: O2Micro, Inc., Santa Clara, CA (US)

( * ) Notice: Subject to any disclaimer, the term of this patent is extended or adjusted under 35 U.S.C. 154(b) by 193 days.

(21) Appl. No.: 13/438,760

(22) Filed: Apr. 3, 2012

(65) Prior Publication Data
US 2013/0257754 A1 Oct. 3, 2013

(51) Int. Cl.
*G06F 3/041* (2006.01)
*G09G 3/36* (2006.01)

(52) U.S. Cl.
USPC ........... 345/173; 345/102; 345/104; 345/156; 345/174; 178/18.01; 178/18.06; 463/37; 463/38

(58) Field of Classification Search
CPC ......... G09G 3/22; G09G 3/06; G09G 3/3406; G09G 3/3413; G09G 3/342
USPC .................. 345/102, 173–179, 157, 104; 178/18.01–18.09, 19.01; 463/37–38
See application file for complete search history.

(56) References Cited

U.S. PATENT DOCUMENTS

| | | | |
|---|---|---|---|
| 2007/0080911 A1* | 4/2007 | Liu et al. | 345/82 |
| 2008/0100234 A1* | 5/2008 | Chen et al. | 315/312 |
| 2009/0225020 A1* | 9/2009 | Ran et al. | 345/102 |
| 2010/0019696 A1* | 1/2010 | Kimura | 315/297 |

* cited by examiner

*Primary Examiner* — Lun-Yi Lao
*Assistant Examiner* — Md Saiful A Siddiqui

(57) ABSTRACT

A display system includes a touch screen and a driving circuit. The touch screen includes touch sensors and a light source. A converter of the driving circuit receives an input voltage and provides a first output voltage to the light source according to a driving signal. A controller of the driving circuit converts the first output voltage to a second output voltage to drive the touch sensors, compares a voltage feedback signal indicating whether the second output voltage reaches a desired voltage level with a current feedback signal indicating whether a current through the light source reaches a desired current level, selects a feedback signal from the voltage feedback signal and the current feedback signal according to the comparison, and generates the driving signal to adjust the first output voltage according to the selected feedback signal.

33 Claims, 17 Drawing Sheets

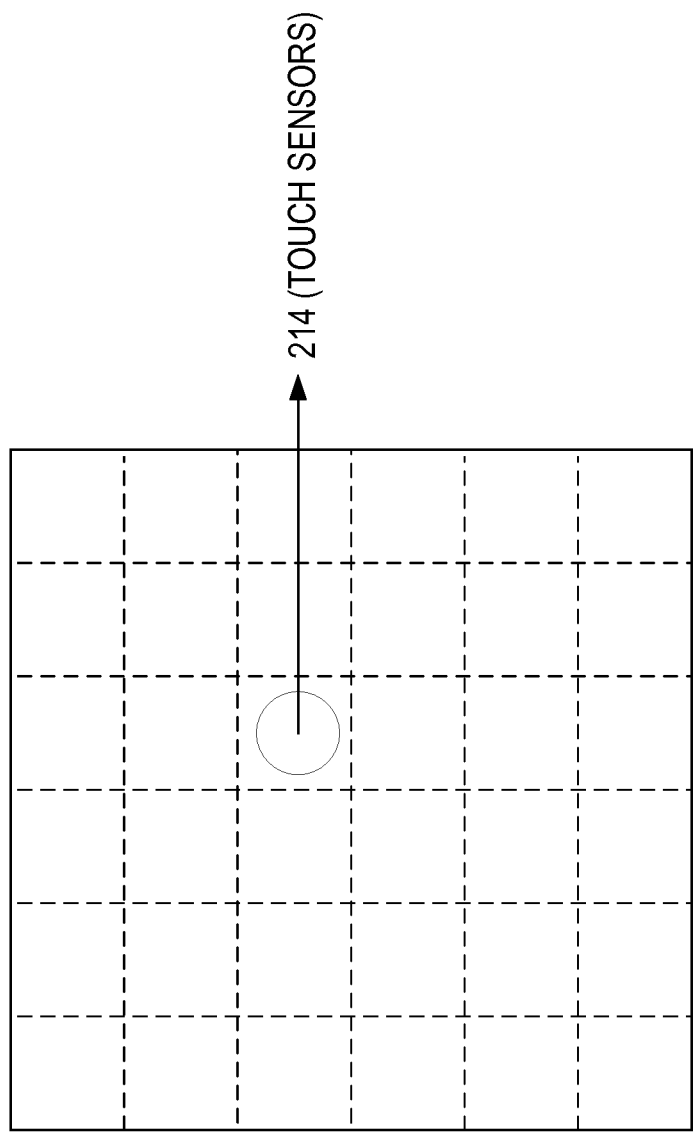
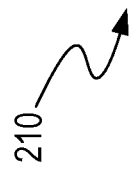
FIG. 2B

| REGISTER | REGISTER FUNCTION | CONTROL DATA | DATA FUNCTION |
|---|---|---|---|
| 802 | PROVIDE REF$_I$ (DESIRED LEVEL I$_{DESIRE}$ FOR I$_{LED}$) | 00000 | I$_{DESIRE}$=I$_1$ |
| | | 00001 | I$_{DESIRE}$=I$_2$ |
| | | 00010 | I$_{DESIRE}$=I$_3$ |
| | | ...... | ...... |
| | | 11111 | I$_{DESIRE}$=I$_{32}$ |
| 804 | PROVIDE REF$_V$ (DESIRED LEVEL V$_{DESIRE}$ FOR V$_{OUT2}$) | 00000 | V$_{DESIRE}$=V$_1$ |
| | | 00001 | V$_{DESIRE}$=V$_2$ |
| | | 00010 | V$_{DESIRE}$=V$_3$ |
| | | ...... | ...... |
| | | 11111 | V$_{DESIRE}$=V$_{32}$ |
| 806 | PROVIDE REF$_{OVP}$ (THRESHOLD LEVEL V$_T$ FOR V$_{OUT1}$) | 000 | V$_T$=V$_{T1}$ |
| | | 001 | V$_T$=V$_{T2}$ |
| | | 010 | V$_T$=V$_{T3}$ |
| | | ...... | ...... |
| | | 111 | V$_T$=V$_{T8}$ |
| 808 | PROVIDE REF$_F$ (MAXIMUM LEVEL F$_{MAX}$ FOR DRIVING SIGNAL) | 00000 | F$_{MAX}$=F$_1$ |
| | | 00001 | F$_{MAX}$=F$_2$ |
| | | 00010 | F$_{MAX}$=F$_3$ |
| | | ...... | ...... |
| | | 11111 | F$_{MAX}$=F$_{32}$ |
| 810 | PROVIDE REF$_{SR}$ (SLEW RATE SR$_{CLKO}$ FOR CLK_OUT) | 0 | SR$_{CLKO}$=SR$_1$ |
| | | 1 | SR$_{CLKO}$=SR$_2$ |
| 812 | PROVIDE REF$_{EN}$ (ENABLE AND DISABLE LED STRINGS) | 0000 | ALL LEDS OFF |
| | | 0001 | LED1-3 ON, LED4 OFF |
| | | 0010 | LED1-2, 4 ON, LED3 OFF |
| | | ...... | ...... |
| | | 1111 | ALL LEDS ON |

FIG. 10

DISPLAY SYSTEMS WITH TOUCH SCREENS

BACKGROUND

A touch screen can be used in electronic devices, such as cellular phones, tablet personal computers, and e-readers. The touch screen displays static images or motion graphics. A light source is equipped in the electronic device to backlight the touch screen. To control the electronic device, a user can enter his control commands by touching a display area of the touch screen with his finger, hand or stylus. The touch screen includes touch sensors for detecting the presence and the location of the user's touch.

FIG. 1 illustrates a block diagram of a conventional display system 100. The display system 100 includes a light source 112 that backlights a touch screen (not shown) and further includes touch sensors 122 within the display area of the touch screen. The display system 100 further includes converters such as a converter 108 and a converter 114, a power source 102, a DC/DC converter 104, a filter 118, a level shifter 120, a converter controller 110, and a converter controller 116.

The converter 108 and the converter 114 are operable for driving the light source 112 and the touch sensors 122, respectively. More specifically, the power source 102 generates an input voltage $V_{IN}$. The application processor 106 generates reference signals 124, 128 and 130, and further generates an input clock signal CLK_IN. The converter 108 receives the input voltage $V_{IN}$ and provides an output voltage $V_{OUT1}$ to power the light source 112. The converter controller 110 coupled to the converter 108 receives the reference signal 124 indicating a desired current level for the current flowing through the light source 112. Accordingly, the converter controller 110 generates a control signal 150 to regulate the output voltage $V_{OUT1}$. Thus, the current flowing through the light source 112 is adjusted to the desired current level.

The converter 114 receives the input voltage $V_{IN}$ and provides an output voltage $V_{OUT2}$. The converter controller 116 coupled to the converter 114 receives the reference signal 130 indicating a desired voltage level for the output voltage $V_{OUT2}$. Accordingly, the converter controller 116 generates a control signal 152 to regulate the output voltage $V_{OUT2}$. The filter 118 filters the output voltage $V_{OUT2}$. The level shifter 120 receives the input clock signal CLK_IN and provides an output clock signal CLK_OUT according to the output voltage $V_{OUT2}$ to drive the touch sensors 122. The frequency of the output clock signal CLK_OUT is equal to the frequency of the input clock signal CLK_IN. Moreover, the low electrical level of the output clock signal CLK_OUT is approximately equal to zero volts, and the high electrical level of the output clock signal CLK_OUT is approximately equal to the output voltage $V_{OUT2}$.

The converter controller 116 further receives the reference signal 128 indicating whether the touch sensors 122 are required to be turned off. If the reference signal 128 is active, the converter controller 116 regulates the output voltage $V_{OUT2}$ to zero volts to switch off the touch sensors 122.

However, the converter 108, the converter controller 110, the converter 114, and the converter controller 116 increase the size and the cost of the display system 100. Moreover, each of the reference signals 124, 128 and 130 is transferred on a respective line to another component. As such, the multiple lines increase the complexity and the cost of the display system 100.

SUMMARY

In one embodiment, a display system includes a touch screen and a driving circuit. The touch screen includes a plurality of touch sensors and a light source that backlights a display panel. The driving circuit coupled to the touch screen includes a converter and a controller. The converter receives an input voltage generated by a power source, and provides a first output voltage to the light source according to a driving signal. The controller coupled to the converter converts the first output voltage to a second output voltage to drive the touch sensors, generates a voltage feedback signal indicating whether the second output voltage reaches a desired voltage level, generates a current feedback signal indicating whether a current flowing through the light source reaches a desired current level, compares the voltage feedback signal with the current feedback signal, selects a feedback signal from the voltage feedback signal and the current feedback signal according to a result of the comparison, and generates the driving signal to adjust the first output voltage according to the selected feedback signal, such that the current and the second output voltage are adjusted to the desired current level and the desired voltage level, respectively.

In one embodiment, the present invention provides a method for controlling a touch screen. The touch screen comprises a plurality of touch sensors and a light source that backlights the touch screen. The method includes: providing a first output voltage to the light source according to a driving signal, converting the first output voltage to a second output voltage to drive the touch sensors, generating a voltage feedback signal indicating whether the second output voltage reaches a desired voltage level, generating a current feedback signal indicating whether a current flowing through the light source reaches a desired current level, comparing the voltage feedback signal with the current feedback signal, selecting a feedback signal from the voltage feedback signal and the current feedback signal according to a result of the comparison, and generating the driving signal to adjust the first output voltage according to the selected feedback signal, such that the current and the second output voltage are adjusted to the desired current level and the desired voltage level, respectively.

In one embodiment, the present invention provides a controller for controlling a touch screen. The touch screen includes a plurality of touch sensors and a light source that backlights the touch screen. The controller includes a voltage control circuit, a current control circuit, and a voltage regulator. The voltage control circuit receives a first voltage for powering the light source, and generates a second voltage according to the first voltage to drive the touch sensors. The voltage control circuit also generates a voltage feedback signal indicating whether the second voltage is adjusted to a desired voltage level. The current control circuit monitors a current flowing through the light source, and generates a current feedback signal indicating whether the current is adjusted to a desired current level. The voltage regulator compares the voltage feedback signal and the current feedback signal, and selects a feedback signal from the voltage feedback signal and the current feedback signal according to a result of the comparison. The voltage regulator generates the driving signal according to the selected feedback signal to regulate the first voltage, such that the current and the second voltage are adjusted to the desired current level and the desired voltage level, respectively.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 2B illustrates an example of a touch screen, in accordance with one embodiment of the present invention.

FIG. 10 illustrates a table diagram associated with the control data stored in a register module, in accordance with one embodiment of the present invention.

DETAILED DESCRIPTION

Figure 1:
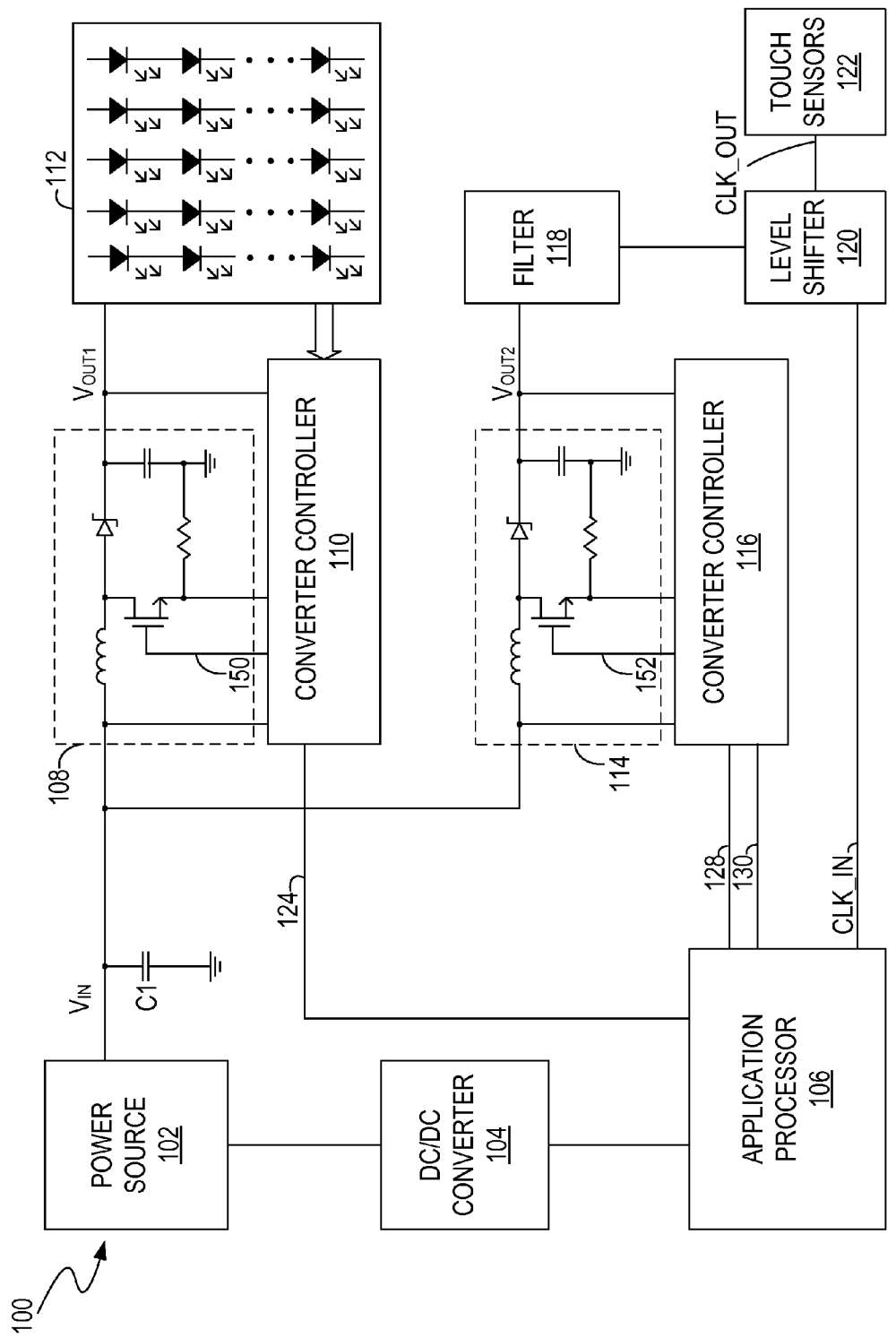
FIG. 1 illustrates a block diagram of a conventional display system.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "providing," "converting," "generating," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide a display system, a controller and a method related to a touch screen. The display system includes a touch screen and a driving circuit. The touch screen includes a plurality of touch sensors and a light source that backlights a display panel. The driving circuit coupled to the touch screen includes a converter and a controller. The converter receives an input voltage generated by a power source, and provides a first output voltage to the light source according to a driving signal. The controller coupled to the converter converts the first output voltage to a second output voltage to drive the touch sensors. The controller generates a voltage feedback signal indicating whether the second output voltage reaches a desired voltage level, and generates a current feedback signal indicating whether a current flowing through the light source reaches a desired current level. The controller compares the voltage feedback signal with the current feedback signal, and selects a feedback signal from the voltage feedback signal and the current feedback signal according to a result of the comparison. The controller generates the driving signal to adjust the first output voltage according to the selected feedback signal, such that the current and the second output voltage are adjusted to the desired current level and the desired voltage level, respectively. Advantageously, the size and the cost of the display system are reduced.

Figure 2A:
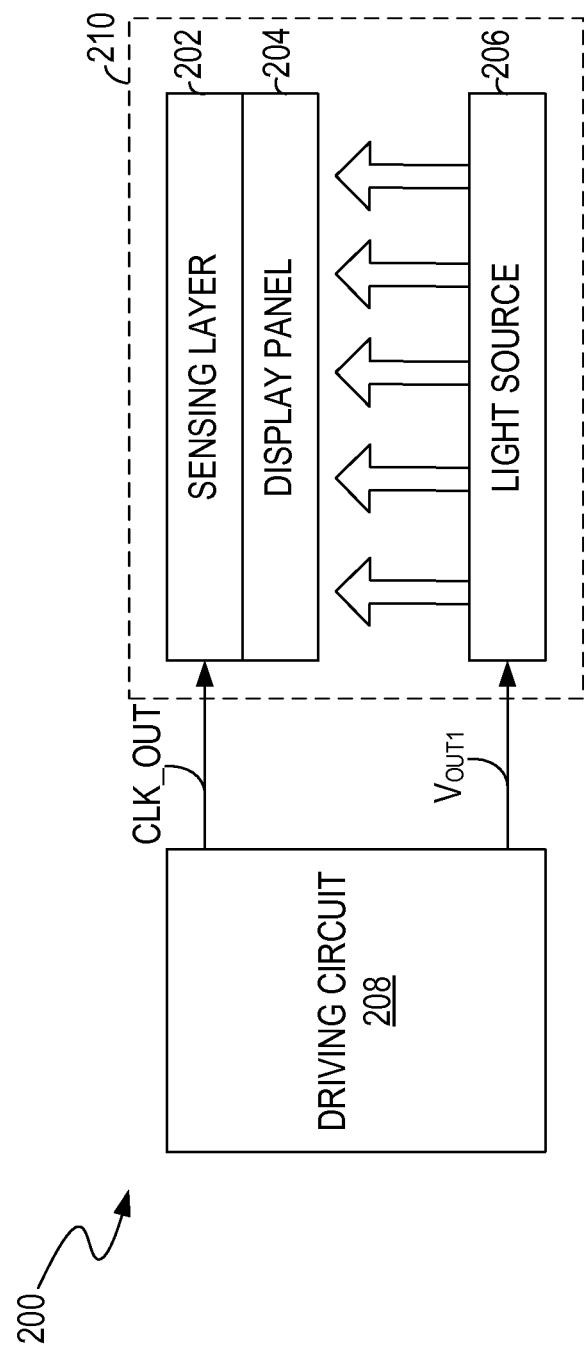
FIG. 2A illustrates a block diagram of a display system, in accordance with one embodiment of the present invention.

FIG. 2A illustrates a block diagram of a display system 200, in accordance with one embodiment of the present invention. In the embodiment of FIG. 2A, the display system 200 includes a touch screen 210 and a driving circuit 208. FIG. 2B illustrates an example of a vertical view of the touch screen 210 shown in FIG. 2A, in accordance with one embodiment of the present invention. FIG. 2B is described in combination with FIG. 2A.

The touch screen 210 includes a sensing layer 202, a display panel 204, and a light source 206. The display panel 204 displays static images or motion graphics. The display area of the display panel 204 is constituted by multiple pixels. The light source 206 is configured to backlight the display panel 204 of the touch-screen 210. The light source 206 can include light-emitting diodes (LEDs), cold cathode fluorescent lamps (CCFLs), or electroluminescence (EL).

Furthermore, a sensing layer 202 including touch sensors 214 is coated on the surface of the touch screen 210. The touch sensors 214 can be, but are not limited to, capacitance touch sensors or resistance touch sensors. The touch sensors are capable of sensing touches of a user's finger or stylus and generating electrical signals indicating the touch action performed by the user. For example, the touch action may cause variations of capacitance or resistance of the touch sensors 214. Thus, a voltage or a current associated with the touch sensors 214 indicate, for example, whether a touch is applied on a particular pixel or a slide is applied across a few pixels. Therefore, the control commands from the user are received. In response, the display system 200 is controlled to perform a particular task, e.g., the display contents shown on the touch screen 210 is changed accordingly.

The driving circuit 208 coupled to the touch screen 210 generates an output voltage $V_{OUT1}$ to power the light source 206 and generates an output clock signal CLK_OUT to drive the touch sensors 214.

Figure 3:
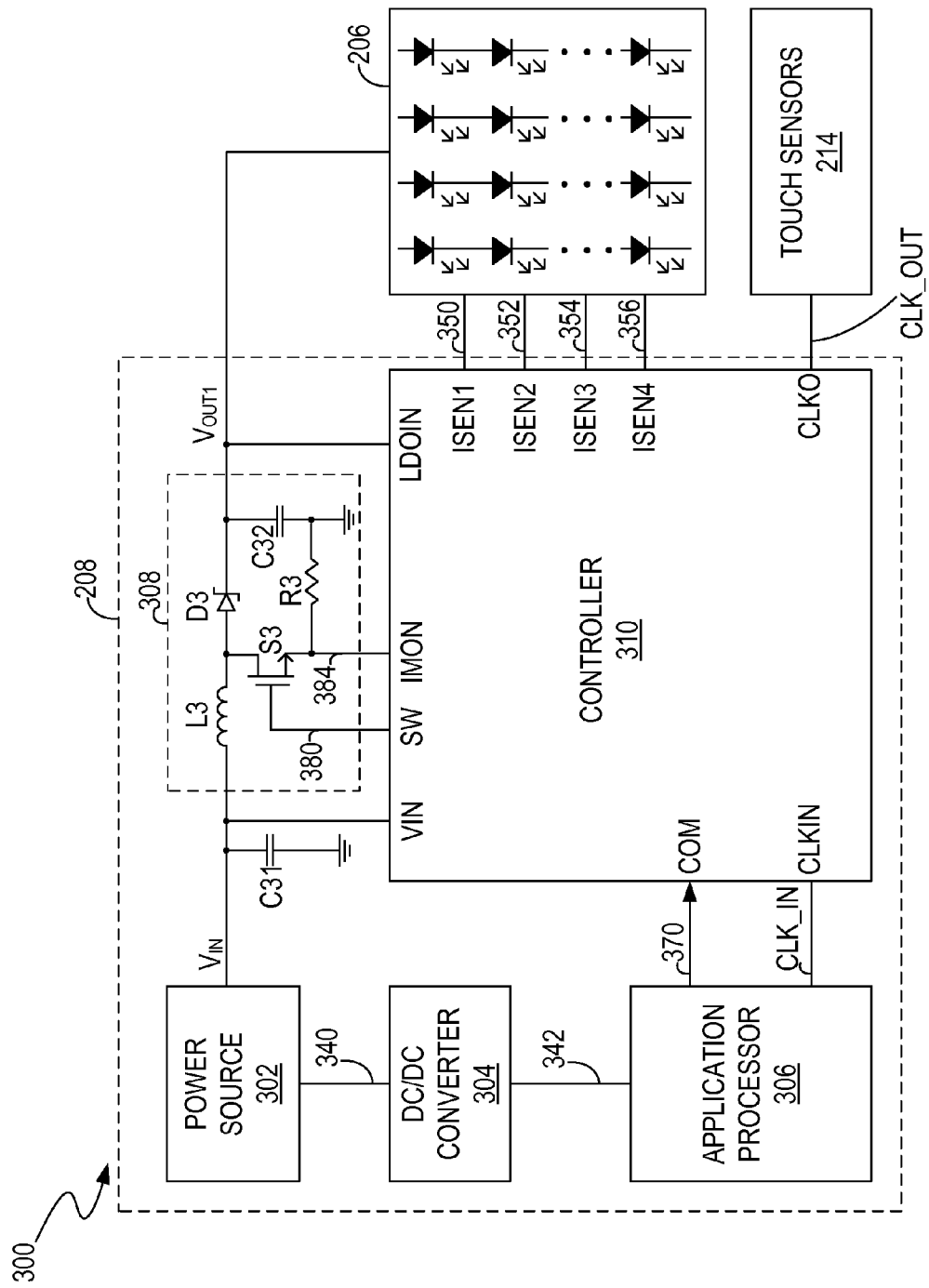
FIG. 3 illustrates another diagram of a display system, in accordance with one embodiment of the present invention.

FIG. 3 illustrates a block diagram of a display system 300, in accordance with one embodiment of the present invention. Elements labeled the same as in FIG. 2A and FIG. 2B have similar functions. FIG. 3 is described in relation to FIG. 2A and FIG. 2B.

The display system 300 includes a driving circuit 208 for driving the light source 206 and the touch sensors 214. In the example of FIG. 3, the driving circuit 208 includes a power source 302, a DC/DC converter 304, an application processor 306, a converter 308, and a controller 310. In one embodiment, the light source 206 includes an LED array having one or more LED strings, and each LED string includes a group of LEDs coupled in series. Although four LED strings are shown in the example of FIG. 3, other number of LED strings can be included in the light source 206. In one embodiment, the controller 310 includes an ISEN1pin, an ISEN2pin, an ISEN3 pin, an ISEN4 pin, a CLKIN pin, a CLKO pin, an LDOIN pin, a SW pin, an IMON pin, a VIN pin and a COM pin.

The converter 308 receives an input voltage $V_{IN}$ generated by the power source 302, and provides an output voltage $V_{OUT1}$ to the light source 206. In one embodiment, the converter 308 can be a boost converter that includes an inductor L3, a diode D3, a switch S3, a resistor R3, and a capacitor C32. The resistor R3 provides a sense signal 384 indicating a current flowing through the inductor L3. The sense signal 384 is received by the controller 310 via the IMON pin. The controller 310 generates a driving signal 380 via the SW pin to control the switch S3, which further regulates the output voltage $V_{OUT1}$. The converter 308 can have other configurations and is not limited to the example shown in FIG. 3.

The DC/DC converter 304 receives a voltage 340 from the power source 302 and converts the voltage 340 to a voltage 342 to power the application processor 306. The application processor 306 can be a micro control unit (MCU), a field-programmable-gate-array (FPGA) unit, or another component that executes machine-executable instructions to perform the following tasks. The application processor 306 generates an input clock signal CLK_IN which is received by the controller 310 via the CLKIN pin. The application processor 306 further generates multiple reference data sets, each of which includes control data indicating a desired value for a particular signal associated with the controller 310. In one embodiment, a first data set transferred through the line 370 contains data indicating a desired current level $I_{DESIRE}$ for the current $I_{LED}$ flowing though the light source 206, and a second data set transferred through the line 370 contains data indicating a desired voltage level $V_{DESIRE}$ for the output voltage $V_{OUT2}$. The line 370 can transfer other data sets and is further described in relation to FIG. 8 and FIG. 9. In the example of FIG. 3, all the reference data sets are transferred to the COM pin of the controller 310 via the single line 370. Alternatively, the reference data sets can be transferred by two or more lines and the controller 310 can have two or more pins to receive the reference data sets.

The controller 310 is operable for controlling the converter 308, the light source 206, and the touch sensors 214. In one embodiment, the controller 310 is integrated on an integrated circuit (IC) chip and is powered by the input voltage $V_{IN}$ via the VIN pin.

In one embodiment, the controller 310 receives the output voltage $V_{OUT1}$ via the LDOIN pin, and converts the output voltage $V_{OUT1}$ to an output voltage $V_{OUT2}$. The controller 310 further receives the input clock signal CLK_IN via the CLKIN pin and generates the output clock signal CLK_OUT via the CLKO pin based on the output voltage $V_{OUT2}$ and the input clock signal CLK_IN. More specifically, in one embodiment, both the input clock signal CLK_IN and the output clock signal CLK_OUT are pulse signals. That is, the input clock signal CLK_IN or the output clock signal CLK_OUT is alternately switched between a high electrical level and a low electrical level. The frequency of the output clock signal CLK_OUT is approximately equal to the frequency of the input clock signal CLK_IN. The high electrical level of the output clock signal CLK_OUT is approximately equal to the output voltage $V_{OUT2}$, and the low electrical level of the output clock signal CLK_OUT is approximately equal to zero volts.

The COM pin of the controller 310 receives the first data set indicating the desired current level $I_{DESIRE}$ for the current $I_{LED}$. In one embodiment, the current $I_{LED}$ represents a total current through the light source 206 (e.g., represented by $I_{LED\_T}$). Alternatively, $I_{LED}$ represents a current through an LED string in the light source 206 (e.g., represented by $I_{LED\_S}$). The pins ISEN1-ISEN4 sense the current $I_{LED}$ by receiving current sense signals 350, 352, 354 and 356 respectively indicating LED string currents $I_{LED1}$-$I_{LED4}$ through the LED strings in the light source 206. The controller 310 further generates a current feedback signal LEDFB indicating whether the current $I_{LED}$ is adjusted to the desired current level $I_{DESIRE}$.

In one embodiment, the output voltage $V_{OUT1}$ determines the level of the current $I_{LED\_T}$, assuming that $I_{LED}$ represents a total current through the light source 206. More specifically, if $V_{OUT1}$ is equal to or greater than a voltage threshold VTH1, the controller 310 automatically adjusts the current $I_{LED\_T}$ to the desired current level $I_{DESIRE}$. At this moment, the current feedback signal LEDFB is substantially equal to a predetermined level $V_{PRE}$. If $V_{OUT1}$ is less than the voltage threshold VTH1, $V_{OUT1}$ is insufficient for the controller 310 to adjust the current $I_{LED}$ to the desired current level $I_{DESIRE}$. The current feedback signal LEDFB is less than the predetermined level $V_{PRE}$. As such, by comparing the current feedback signal LEDFB to the predetermined level $V_{PRE}$, the controller 310 determines whether the current $I_{LED\_T}$ is adjusted to the desired current level $I_{DESIRE}$. In one embodiment, when LEDFB is less than $V_{PRE}$, the feedback signal LEDFB also indicates how much level of the output voltage $V_{OUT1}$ is required for the current $I_{LED\_T}$ to reach the desired current level $I_{DESIRE}$.

In an alternative embodiment, $I_{LED}$ represents a current flowing through an LED string in the light source 206, e.g., $I_{LED\_S}$. In such instance, the voltage $V_{OUT1}$ determines the current level of the currents $I_{LED1}$-$I_{LED4}$. more specifically, if $V_{OUT1}$ is equal to or greater than the voltage threshold VTH1, the controller 310 automatically adjusts each of the currents $I_{LED1}$-$I_{LED4}$ to the desired current level $I_{DESIRE}$. At this moment, the current feedback signal LEDFB is substantially equal to the predetermined level $V_{PRE}$. If $V_{OUT1}$ is less than the voltage threshold VTH1, $V_{OUT1}$ is insufficient for the controller 310 to adjust the currents $I_{LED1}$-$I_{LED4}$ to the desired current level $I_{DESIRE}$. The current feedback signal LEDFB is less than the predetermined level $V_{PRE}$. As such, by comparing the current feedback signal LEDFB to the predetermined level $V_{PRE}$, the controller 310 determines whether the current $I_{LED\_S}$ is adjusted to the desired current level $I_{DESIRE}$. In one embodiment, when LEDFB is less than $V_{PRE}$, the feedback signal LEDFB also indicates how much level of the output voltage $V_{OUT1}$ is required for the current $I_{LED\_S}$ to reach the desired current level $I_{DESIRE}$.

In one embodiment, the COM pin receives the second data set indicating the desired voltage level $V_{DESIRE}$ for the output voltage $V_{OUT2}$. In one embodiment, the output voltage $V_{OUT1}$ determines the level of the output voltage $V_{OUT2}$. More specifically, if the output voltage $V_{OUT1}$ is equal to or greater than a voltage threshold VTH2, the controller 310 automatically adjusts the output voltage $V_{OUT2}$ to the desired voltage level $V_{DESIRE}$. At this moment, the voltage feedback signal LDOFB is greater than the predetermined level $V_{PRE}$. If the output voltage $V_{OUT1}$ is less than the voltage threshold VTH2, $V_{OUT1}$ is insufficient for the controller 310 to adjust the output voltage $V_{OUT2}$ to the desired voltage level $V_{DESIRE}$. The voltage feedback signal LDOFB is less than the predetermined level $V_{PRE}$. As such, by comparing the voltage feedback signal LDOFB to the predetermined level $V_{PRE}$, the controller 310 determines whether the output voltage $V_{OUT2}$ is adjusted to the desired voltage level $V_{DESIRE}$. In one embodiment, when the output voltage $V_{OUT2}$ is less than the desired voltage level $V_{DESIRE}$, the voltage feedback signal LDOFB also indicates how much level of the output voltage $V_{OUT1}$ is required for the output voltage $V_{OUT2}$ to reach the desired voltage level $V_{DESIRE}$.

Therefore, the output voltage $V_{OUT1}$ determines both the current $I_{LED}$ and the output voltage $V_{OUT2}$. Advantageously, if one or both of the current $I_{LED}$ and the output voltage $V_{OUT2}$ do not reach the desired levels, the controller 310 compares the voltage feedback signal LDOFB with the current feedback signal LEDFB to determine which of the current $I_{LED}$ and the output voltage $V_{OUT2}$ requires a higher level of the output voltage $V_{OUT1}$, in one embodiment. The controller 310 selects a feedback signal from the signals LDOFB and LEDFB, and controls the driving signal 380 to adjust the output voltage $V_{OUT1}$ according to the selected feedback signal. For example, if the current $I_{LED}$ requires a higher level of the output voltage $V_{OUT1}$ than the output voltage $V_{OUT2}$ (that is, the voltage threshold VTH1 is greater than the voltage threshold VTH2), the feedback signal LEDFB is selected and the output voltage $V_{OUT1}$ is adjusted to the voltage threshold VTH1 according to LEDFB. If the current $I_{LED}$ requires a lower level of the output voltage $V_{OUT1}$ than the output voltage $V_{OUT2}$ (that is, the voltage threshold VTH1 is less than the voltage threshold VTH2), the feedback signal LDOFB is selected and the output voltage $V_{OUT1}$ is adjusted to the voltage threshold VTH2 according to LDOFB. In both circumstances, the output voltage $V_{OUT1}$ satisfies the power needs for both the light source 206 and the touch sensors 214. Therefore, the current $I_{LED}$ and the output voltage $V_{OUT2}$ are adjusted to the desired current level $I_{DESIRE}$ and the desired voltage level $V_{DESIRE}$, respectively.

Advantageously, the driving circuit 208 in one embodiment of the present invention employs the converter 308, instead of the converters 108 and 114 of the display system 100 in FIG. 1. Therefore, the size and the cost of the display system 300 are reduced. Moreover, compared to the display system 100 which employs multiple lines to transfer the reference signals 124, 128 and 130, the display system employs a single line 370 to transfer multiple data sets. Thus, the complexity and the cost of the display system 300 are further reduced.

Figure 4:
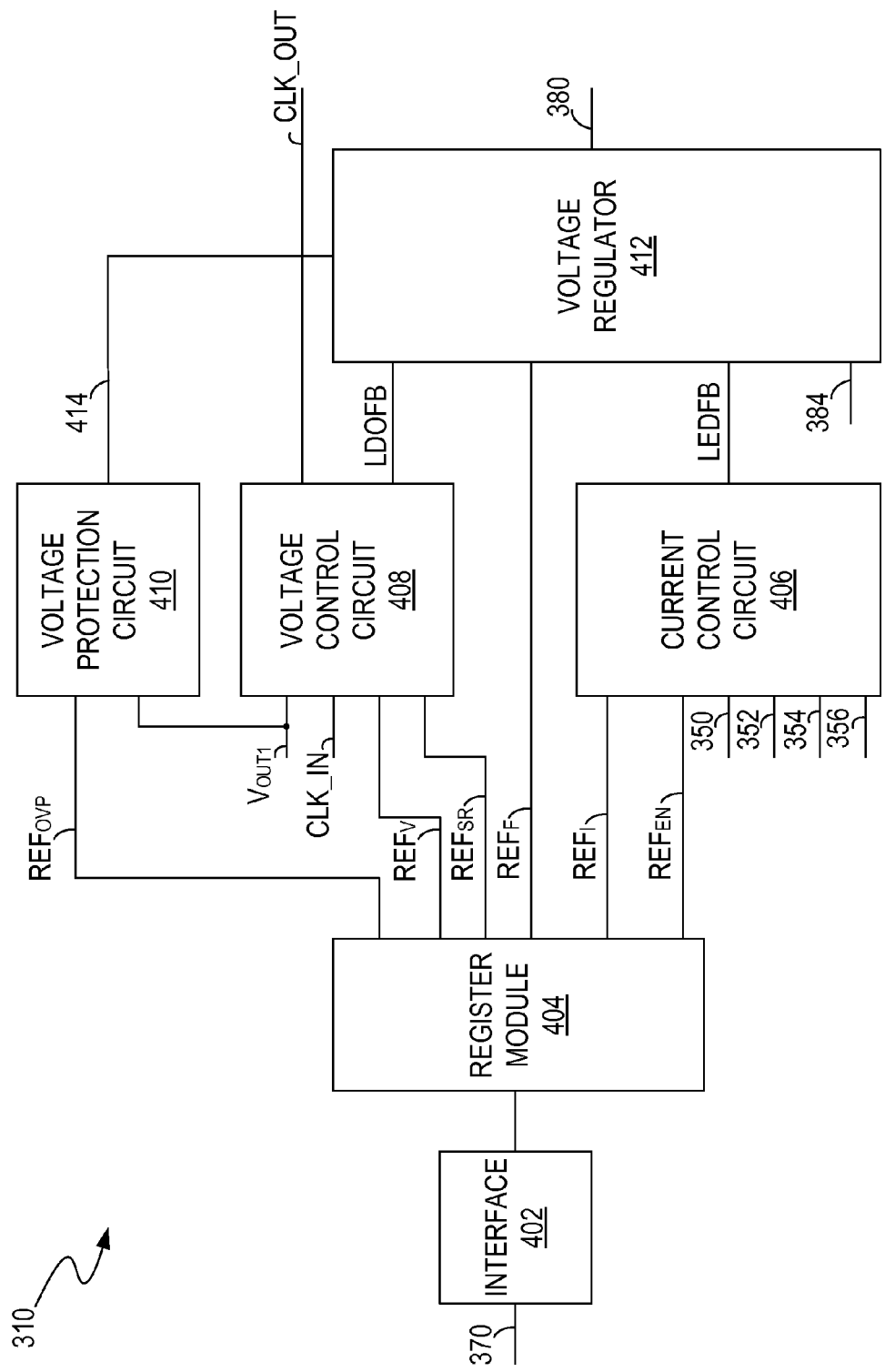
FIG. 4 illustrates a block diagram of a controller, in accordance with one embodiment of the present invention.

FIG. 4 illustrates a block diagram of the controller 310, in accordance with one embodiment of the present invention. Elements labeled the same as in FIG. 3 have similar functions. FIG. 4 is described in combination with FIG. 3. In the following descriptions, the current $I_{LED}$ represents the current $I_{LED\_S}$ for a single LED string, for illustrative purposes. However, this invention is not so limited; the current $I_{LED}$ can represent a total current flowing through the light source 206, in another embodiment.

In one embodiment, the controller 310 includes an interface 402, a register module 404, a current control circuit 406, a voltage control circuit 408, a voltage regulator 412, and a voltage protection circuit 410. In one embodiment, the interface 402 coupled to the line 370 serves as an I/O (input/output) interconnect between the controller 310 and the application processor 306. The interface 402 can be, but is not limited to, 1-Wire interface, System Management Bus (SM-Bus) interface, Inter Integrated Circuit (I2C) interface, or Serial Peripheral Interface (SPI).

The register module 404 coupled to the interface 402 receives the data sets transferred from the application processor 306 and provides multiple reference signals accordingly. More specifically, in one embodiment, the reference signals include a reference signal $REF_I$ indicating the desired current level $I_{DESIRE}$ for the current $I_{LED}$, a reference signal $REF_V$ indicating the desired voltage level $V_{DESIRE}$ for the output voltage $V_{OUT2}$, a reference signal $REF_{OVP}$ indicating a voltage protection threshold $V_T$ for the output voltage $V_{OUT1}$, a reference signal $REF_F$ indicating a desired maximum frequency $F_{MAX}$ for the driving signal 380, a reference signal $REF_{SR}$ indicating a desired slew rate $SR_{CLKO}$ for the output clock signal CLK_OUT, and a reference signal $REF_{EN}$ indicating which of the LED strings are required to be on. The operation of the register module 404 is further described in relation to FIG. 8 and FIG. 10.

The current control circuit 406 receives the current sense signals 350, 352, 354 and 356 indicating currents $I_{LED1}$-$I_{LED4}$ flowing through the LED strings in the light source 206, respectively. The current control circuit 406 further receives the reference signal $REF_I$ indicating the desired current level $I_{DESIRE}$ and adjusts each of the currents $I_{LED1}$-$I_{LED4}$ to the desired current level $I_{DESIRE}$. The current control circuit 406 generates the current feedback signal LEDFB according to the reference signal $REF_I$ and the current sense signals 350-356. Moreover, the current control circuit 406 receives the reference signal $REF_{EN}$ indicating which of the LED strings are required to be on. Accordingly, the current control circuit 406 enables and disables corresponding LED strings. The current control circuit 406 is further described in relation to FIG. 6A and FIG. 6B.

The voltage control circuit 408 receives the reference signal $REF_V$ which indicates the desired voltage level $V_{DESIRE}$ for the output voltage $V_{OUT2}$. Accordingly, the voltage control circuit 408 converts the output voltage $V_{OUT1}$ to the output voltage $V_{OUT2}$. The voltage control circuit 408 further receives the input clock signal CLK_IN, and generates the output clock signal CLK_OUT to drive the touch sensors 214. In one embodiment, the voltage control circuit 408 generates the voltage feedback signal LDOFB according to the reference signal $REF_V$, the output voltage $V_{OUT1}$ and the output voltage $V_{OUT2}$.

As described in relation to FIG. 3, the output clock signal CLK_OUT is a pulse signal, which alternates between a high electrical level and a low electrical level. Thus, a slew rate $SR_{CLKO}$ of the output clock signal CLK_OUT represents a change rate when the pulse signal is switched from the high electrical level to the low electrical level or from the low electrical level to the high electrical level. In one embodiment, the voltage control circuit 408 further receives the reference signal $REF_{SR}$ indicating a desired value for the slew rate $SR_{CLKO}$. Accordingly, the voltage control circuit 408 adjusts the slew rate $SR_{CLKO}$ to the desired value. The operation of the voltage control circuit 408 is further described in relation to FIG. 5A and FIG. 5B.

The voltage regulator 412 receives the current feedback signal LEDFB, the voltage feedback signal LDOFB and the sense signal 384, and generates the driving signal 380 to regulate the voltage $V_{OUT1}$ accordingly. Therefore, the output voltage $V_{OUT1}$ satisfies the power needs from both the current $I_{LED}$ and the output voltage $V_{OUT2}$. Thus, the current $I_{LED}$ and the output voltage $V_{OUT2}$ are adjusted to the desired current level $I_{DESIRE}$ and the desired voltage level $V_{DESIRE}$, respectively.

In one embodiment, the voltage regulator 412 further receives the reference signal $REF_F$ indicating the maximum frequency $F_{MAX}$ for the driving signal 380 generated by the controller 310. In one embodiment, the driving signal 380 can be a pulse-width modulation signal. The frequency of the driving signal 380 determines the switching frequency of the converter 308. In one embodiment, the voltage regulator 412 keeps the frequency of the driving signal 380 below the maximum frequency $F_{MAX}$ according to the reference signal $REF_F$, which achieves a relatively high power efficiency for the converter 308. The operation of the voltage regulator 412 is further described in relation to FIG. 7.

In one embodiment, the voltage protection circuit 410 receives the reference signal $REF_{OVP}$ indicating the voltage protection threshold $V_T$. The voltage protection circuit 410 compares the output voltage $V_{OUT1}$ to the voltage protection threshold $V_T$, and determines whether the output voltage $V_{OUT1}$ undergoes an abnormal condition, e.g., an over-voltage condition, according to a result of the comparison. If an over-voltage condition occurs, the voltage protection circuit 410 provides an alert signal 414 to the voltage regulator 412 to disable the driving signal 380. For example, the driving signal 380 is maintained at a low electrical level to switch off the switch S3 when the over-voltage condition is detected.

Figure 5A:
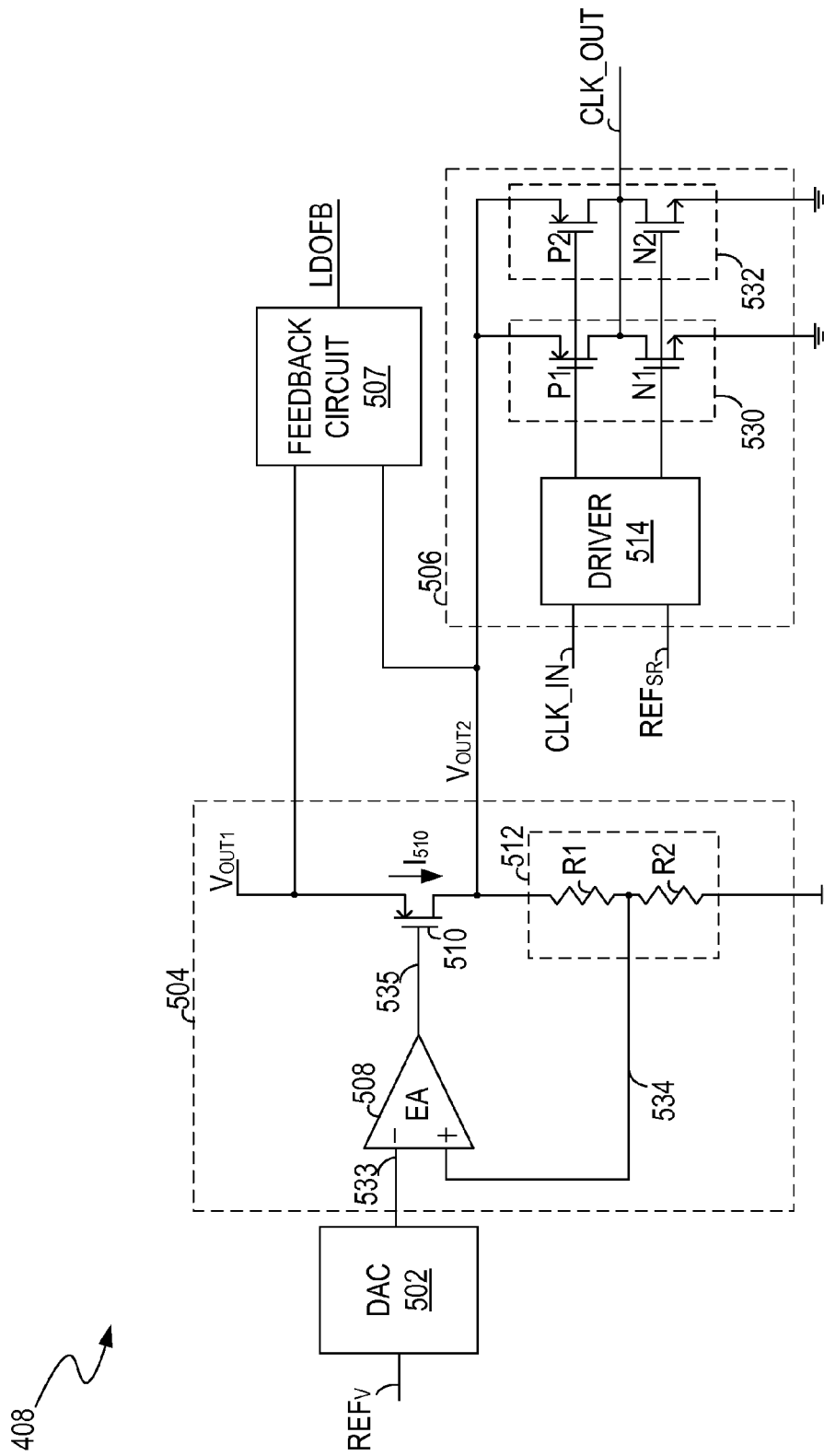
FIG. 5A illustrates an example of a voltage control circuit, in accordance with one embodiment of the present invention.
Figure 5B:
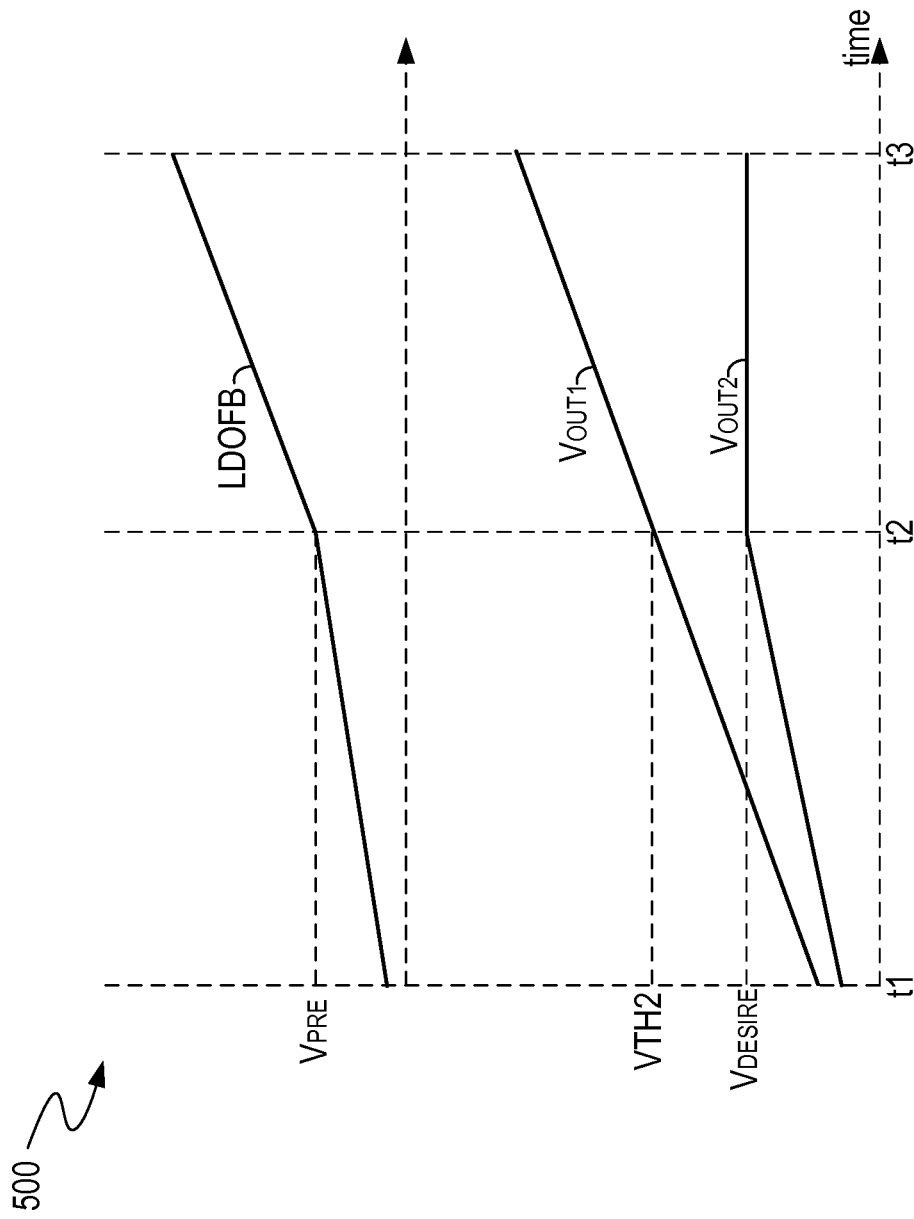
FIG. 5B illustrates an example of a waveform of signals generated or received by a voltage control circuit, in accordance with one embodiment of the present invention.

FIG. 5A illustrates an example of the voltage control circuit 408, in accordance with one embodiment of the present invention. Elements labeled the same as in FIG. 3 and FIG. 4 have similar functions. FIG. 5B illustrates an example of a waveform 500 of signals generated or received by the voltage control circuit 408, in accordance with one embodiment of the present invention. FIG. 5A and FIG. 5B are described in combination with FIG. 3 and FIG. 4. FIG. 5B shows the output voltage $V_{OUT1}$, the output voltage $V_{OUT2}$, and the voltage feedback signal LDOFB.

In the example of FIG. 5A, the voltage control circuit 408 includes a digital-to-analog converter (DAC) 502, a low-dropout (LDO) regulator 504, a level shifter 506, and a feedback circuit 507. The DAC 502 receives the reference signal $REF_V$, and provides an analog reference signal 533 indicative of the desired voltage level $V_{DESIRE}$ for the output voltage $V_{OUT2}$.

The low-dropout regulator 504 converts the output voltage $V_{OUT1}$ to the output voltage $V_{OUT2}$. In one embodiment, the low-dropout (LDO) regulator 504 includes an error amplifier 508, a transistor 510, and a voltage divider 512. The voltage divider 512 including a resistor R1 and a resistor R2 generates a dividing signal 534 proportional to the output voltage $V_{OUT2}$. The error amplifier 508 amplifies a difference between the analog reference signal 533 and the dividing signal 534 to generate an amplifying signal 535. In one embodiment, the transistor 510 can be a P-type metal-oxide-semiconductor-field-effect transistor (MOSFET). The transistor 510 has a source for receiving the output voltage $V_{OUT1}$, a gate for receiving the amplifying signal 535, and a drain for providing the output voltage $V_{OUT2}$. The amplifying signal 535 controls the current $I_{510}$ flowing through the transistor 510, which determines the output voltage $V_{OUT2}$.

In operation, the error amplifier 508, the transistor 510 and the resistor R1 constitute a negative-feedback path to regulate the output voltage $V_{OUT2}$. In one embodiment, if $V_{OUT1}$ is less than the voltage threshold VTH2, $V_{OUT1}$ is insufficient for the low-dropout regulator 504 to adjust the output voltage $V_{OUT2}$ to the desired voltage level $V_{DESIRE}$. For example, between t1 and t2, $V_{OUT1}$ is less than the voltage threshold VTH2, and thus $V_{OUT2}$ is less than $V_{DESIRE}$.

If $V_{OUT1}$ is greater than the voltage threshold VTH2, e.g., between t2 and t3, the negative-feedback path enters a balance state. In the balance state, the dividing signal 534 is maintained to be substantially equal to the analog reference signal 533. In other words, the output voltage $V_{OUT2}$ is stabilized at the desired voltage level $V_{DESIRE}$. For example, if $V_{OUT2}$ becomes greater than $V_{DESIRE}$, e.g., due to the noises, the dividing signal 534 goes up, which increases the amplifying signal 535. Thus, the transistor 510 decreases the current $I_{510}$ to decrease the output voltage $V_{OUT2}$. Likewise, if $V_{OUT2}$ becomes less than $V_{DESIRE}$, the dividing signal 534 goes down, which decreases the amplifying signal 535. Thus, the transistor 510 increases the current $I_{510}$ to increase the output voltage $V_{OUT2}$.

The feedback circuit 507 coupled to the low-dropout regulator 504 is operable for generating the voltage feedback signal LDOFB. The feedback circuit 507 receives both the output voltage $V_{OUT1}$ and the output voltage $V_{OUT2}$ and generates the voltage feedback signal LDOFB, accordingly. In one embodiment, the voltage feedback signal LDOFB is proportional to a difference between the output voltage $V_{OUT1}$ and the output voltage $V_{OUT2}$. As shown in FIG. 5B, when the output voltage $V_{OUT2}$ is equal to $V_{DESIRE}$, e.g., when $V_{OUT1}$ is equal to or greater than VTH2 between t2 and t3, the voltage feedback signal LDOFB is greater than the predetermined level $V_{PRE}$. When the output voltage $V_{OUT2}$ is less than $V_{DESIRE}$ between t1 and t2, the voltage feedback signal LDOFB is less than the predetermined level $V_{PRE}$. In addition, the voltage feedback signal LDOFB indicates how much level of the output voltage $V_{OUT1}$ is required for the output voltage $V_{OUT2}$ to reach the desired voltage level $V_{DESIRE}$. For example, a smaller value of the voltage feedback signal LDOFB indicates that the output voltage $V_{OUT1}$ needs to increase more.

In one embodiment, the level shifter 506 includes a driver 514 and buffers 530 and 532. The buffer 530 includes a PMOS transistor P1 and an NMOS transistor N1 coupled in series. The buffer 532 includes a PMOS transistor P2 and an NMOS transistor N2 coupled in series. The sources of the transistors P1 and P2 are coupled to the output of the LDO regulator 504 for receiving the output voltage $V_{OUT2}$. The sources of the transistors N1 and N2 are coupled to ground. A common node of the transistors P1 and N1 is coupled to a common node of the transistors P2 and N2 for generating the output clock signal CLK_OUT.

The driver 514 receives the input clock signal CLK_IN and the reference signal $REF_{SR}$ indicating the desired slew rate $SR_{CLKO}$ for the output clock signal CLK_OUT, and controls the buffers 530 and 532 to generate the output clock signal CLK_OUT. In one embodiment, when the input clock signal CLK_IN has a low electrical level, the driver 514 turns on the PMOS transistors P1 and/or P2 and turns off both the NMOS transistors N1 and N2. Thus, the output clock signal CLK_OUT is pulled up to a level equal to the output voltage $V_{OUT2}$. When the input clock signal CLK_IN has a high electrical level, the driver 514 turns off both the PMOS transistors P1 and P2 and turns on the NMOS transistors N1 and/or N2. Thus, the output clock signal CLK_OUT is pulled down to a level equal to ground. As such, the frequency of the output clock signal CLK_OUT is equal to the frequency of the input clock signal CLK_IN. Moreover, the high electrical level of the output clock signal CLK_OUT is equal to the output voltage $V_{OUT2}$. Since the output voltage $V_{OUT2}$ is equal to the desired voltage level $V_{DESIRE}$, the output clock signal CLK_OUT satisfies the power need of the touch sensors 214.

In one embodiment, the driver 514 adjusts the slew rate of the output clock signal CLK_OUT by selecting the number of operative buffers according to the reference signal $REF_{SR}$. As described herein, a buffer 530 or 532 is operative when the corresponding PMOS and NMOS transistors are alternately turned on and off based on the reference signal $REF_{SR}$, and is inoperative when both the corresponding PMOS and NMOS transistors are maintained to be off. More specifically, in one embodiment, if the buffer 530 is selected to be operative and the buffer 532 is not selected, the transistor P1 is turned on to switch the output clock signal CLK_OUT from a low electrical level to a high electrical level. Thus, an equivalent resistance R1 coupled between the output of LDO regulator 504 and the output of the level shifter 506 is equal to the resistance $R_{P1}$ of the transistor P1, e.g., R1 $=R_{P1}$. In comparison, if both the buffers 530 and 532 are selected to be operative, both the transistors P1 and P2 are turned on to switch the output clock signal CLK_OUT from the low electrical level to the high electrical level. Thus, the equivalent resistance R1' is equal to the resistance provided by the paralleled transistors P1 and P2, e.g., R1'$=R_{P1}//R_{P2}$. As such, R1' is less than R1. In one embodiment, the slew rate has a value $SR_1$ when only buffer 530 is operative and has a value $SR_2$ when both the buffers 530 and 532 are operative. As the time constant is determined by the equivalent resistance, e.g., R1 or R1', the value $SR_1$ is less than the value $SR_2$. The slew rate when the output clock signal CLK_OUT falls from the high electrical level to the low electrical level has a similar condition to that when CLK_OUT rises from the low electrical level to the high electrical level.

Therefore, if the reference signal $REF_{SR}$ indicates that the desired value for the slew rate $SR_{CLKO}$ is $SR_1$, the driver 514 enables the buffer 530 and disables the buffer 532. If the reference signal $REF_{SR}$ indicates that the desired value for the slew rate $SR_{CLKO}$ is $SR_2$, the driver 514 enables both the buffers 530 and 532. The level shifter 506 can include other number of buffers and is not limited to the example shown in FIG. 5A.

Figure 6A:
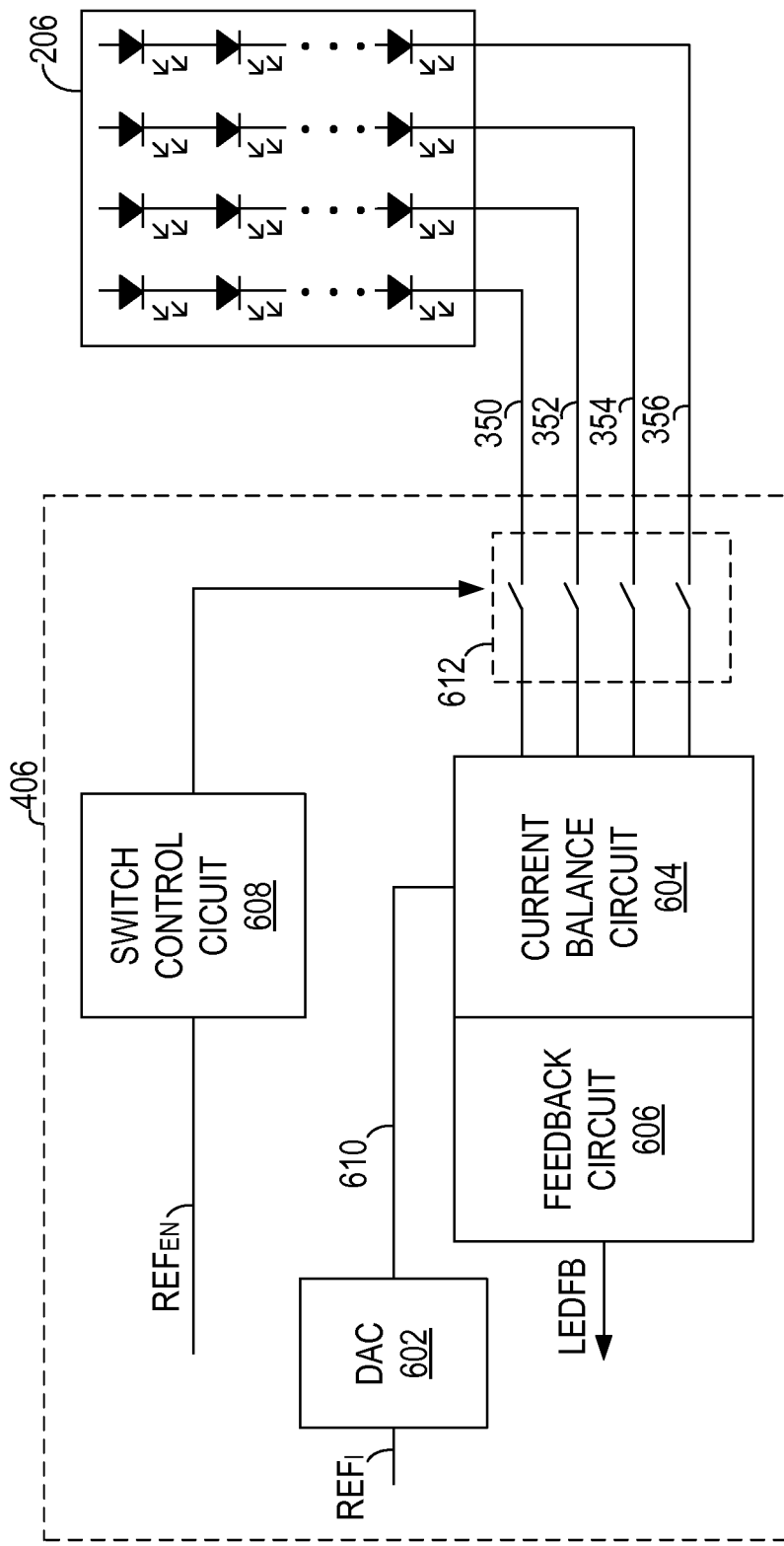
FIG. 6A illustrates an example of a current control circuit, in accordance with one embodiment of the present invention.
Figure 6B:
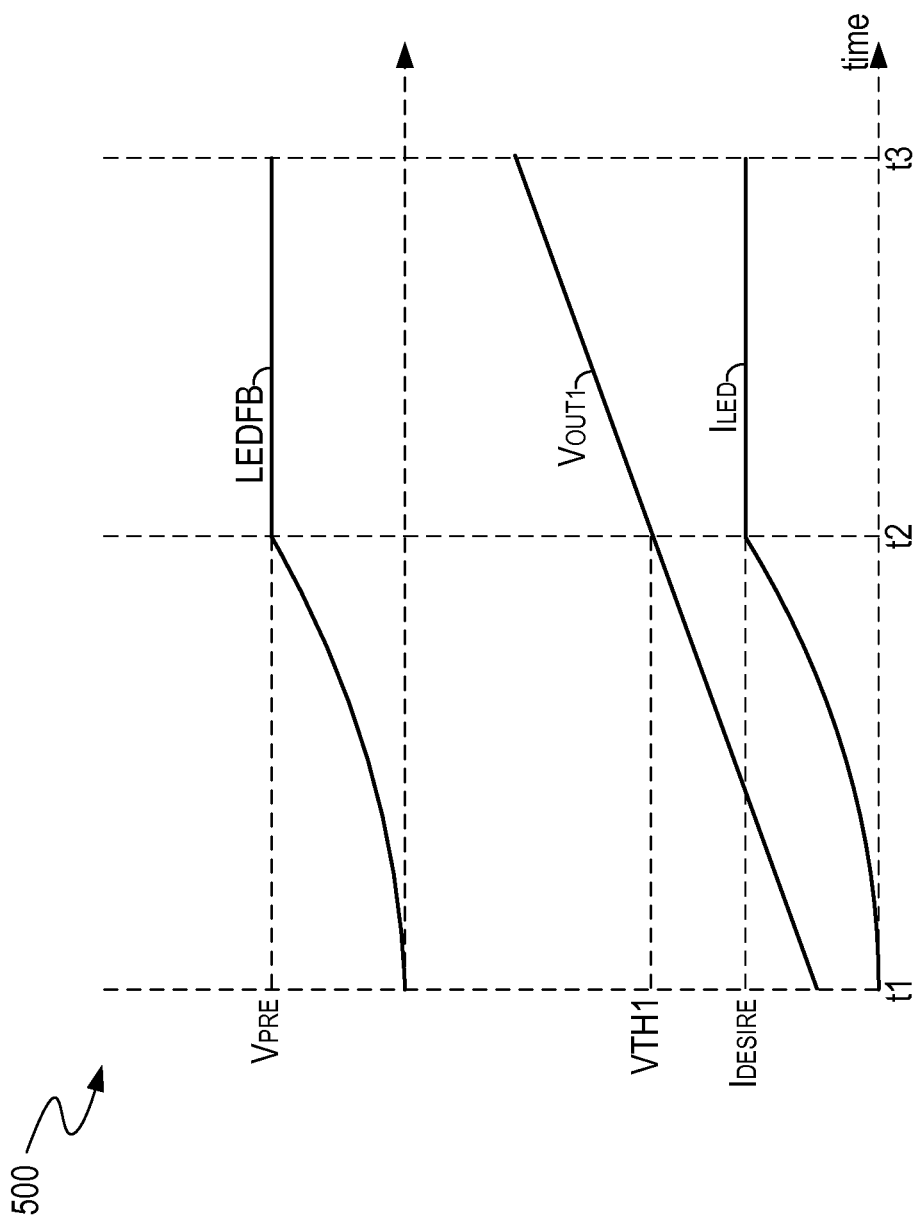
FIG. 6B illustrates an example of a waveform of signals generated or received by a current control circuit, in accordance with one embodiment of the present invention.

FIG. 6A illustrates an example of the current control circuit 406, in accordance with one embodiment of the present invention. Elements labeled the same as in FIG. 3 and FIG. 4 have similar functions. FIG. 6B illustrates an example of a waveform 600 of signals generated or received by the current control circuit 406, in accordance with one embodiment of the present invention. FIG. 6A and FIG. 6B are described in combination with FIG. 3 and FIG. 4. FIG. 6B shows the output voltage $V_{OUT1}$, the current $I_{LED}$, and the current feedback signal LEDFB.

In the example of FIG. 6A, the current control circuit 406 includes a DAC 602, a current balance circuit 604, a feedback circuit 606, and a switch control circuit 608. The DAC 602 receives the reference signal $REF_I$, and provides an analog reference signal 610 indicative of the desired current level $I_{DESIRE}$ accordingly. The current balance circuit 604 monitors the currents $I_{LED1}$-$I_{LED4}$ by receiving the current sense signals 350-356. In one embodiment, the current balance circuit 604 performs current balancing by equalizing currents flowing through the operative LED strings. Therefore, the LED strings in the light source 206 provide a uniform brightness.

Moreover, the current balance circuit 604 receives the analog reference signal 610 indicating the desired current level $I_{DESIRE}$. Accordingly, the current balance circuit 604 adjusts each of the currents $I_{LED1}$-$I_{LED4}$ to the desired current level $I_{DESIRE}$. More specifically, as shown in FIG. 6B, if the output voltage $V_{OUT1}$ is less than the voltage threshold VTH1, $V_{OUT1}$ is insufficient for the current balance circuit 604 to adjust the current $I_{LED}$ to the desired current level $I_{DESIRE}$. Instead, the current $I_{LED}$ varies according to the output voltage $V_{OUT1}$ and is less than the desired current level $I_{DESIRE}$. If the voltage $V_{OUT1}$ is greater than the voltage threshold VTH1, the current balance circuit 604 automatically adjusts the current $I_{LED}$ to the desired current level $I_{DESIRE}$, for example, each of the currents $I_{LED1}$-$I_{LED4}$ is adjusted to the desired current level $I_{DESIRE}$.

In one embodiment, the feedback circuit 606 coupled to the current balance circuit 604 generates the current feedback signal LEDFB proportional to a minimum current among the currents $I_{LED1}$-$I_{LED4}$. As shown in FIG. 6B, the feedback signal LEDFB varies according to the current $I_{LED}$. For example, between t1 and t2, the current feedback signal LEDFB is less than the predetermined level $V_{PRE}$, which indicates that the current $I_{LED}$ is less than the desired current level $I_{DESIRE}$. Between t2 and t3, the current feedback signal LEDFB is equal to the predetermined level $V_{PRE}$, which indicates that the current $I_{LED}$ reaches the desired current level $I_{DESIRE}$.

Moreover, when the current feedback signal LEDFB is less than the predetermined level $V_{PRE}$, the current feedback signal LEDFB varies according to the output voltage $V_{OUT1}$. For example, the current feedback signal LEDFB increases as the output voltage $V_{OUT1}$ increases, and vice versa. Thus, the feedback signal LEDFB also indicates how much level of the output voltage $V_{OUT1}$ is required for the current $I_{LED}$ to reach the desired current level $I_{DESIRE}$. For example, a smaller value of the current feedback signal LEDFB indicates that the output voltage $V_{OUT1}$ needs to increase more.

In one embodiment, the current control circuit 406 further includes switches 612 coupled to each LED string in the light source 206. The switch control circuit 608 receives the reference signal $REF_{EN}$ indicating which of the LED strings are required to be on, and turns the switches 612 on and off accordingly. As such, some LED strings are controlled to be operative and the others are controlled to be inoperative.

Figure 7A:
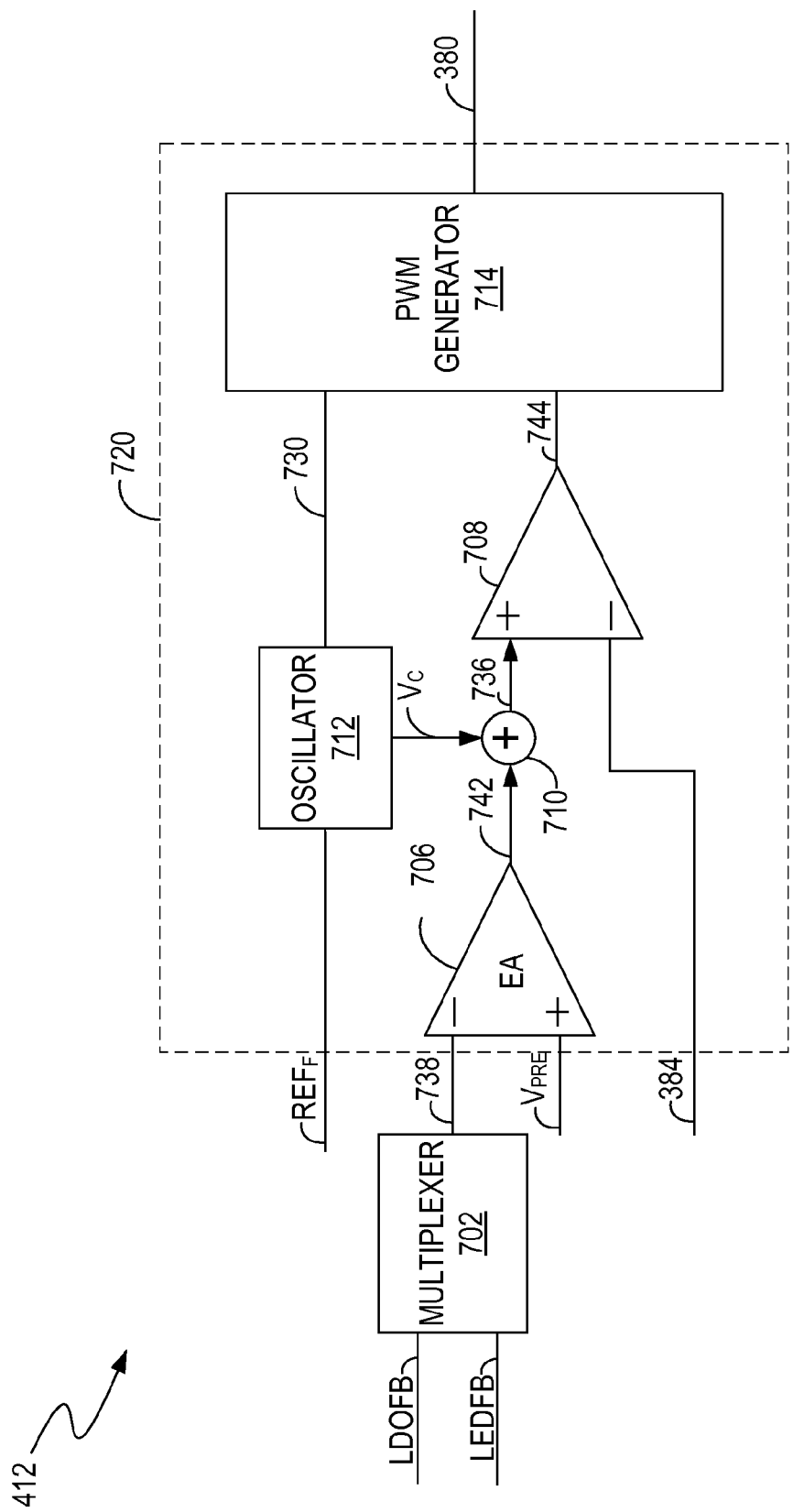
FIG. 7A illustrates an example of a voltage regulator, in accordance with one embodiment of the present invention.

FIG. 7A illustrates an example of the voltage regulator 412, in accordance with one embodiment of the present invention. Elements labeled the same as in FIG. 3 and FIG. 4 have similar functions. FIG. 7A is described in combination with FIG. 3 and FIG. 4.

In the example of FIG. 7A, the voltage regulator 412 includes a multiplexer 702 and a driving circuit 720. The multiplexer 702 compares the current feedback signal LEDFB to the voltage feedback signal LDOFB, and select a feedback signal 738 from the signals LEDFB and LDOFB according to a result of the comparison. In one embodiment, the feedback signal 738 is the smaller signal of the signals LEDFB and LDOFB. For example, if LEDFB is less than LDOFB, indicating that the light source 206 requires a higher level of the output voltage $V_{OUT1}$ than the touch sensors 214, LEDFB is transferred to the driving circuit 720. If LDOFB is less than LEDFB, indicating that the touch sensors 214 requires a higher level of the output voltage $V_{OUT1}$ than the light source 206, the signal LDOFB is transferred to the driving circuit 720.

In one embodiment, the driving circuit 720 includes an error amplifier 706, a comparator 708, an adder 710, an oscillator 712 and a PWM generator 714. The error amplifier 706 receives the feedback signal 738 at the inverting terminal and receives the predetermined level $V_{PRE}$ at the non-inverting terminal. The error amplifier 706 amplifies a difference between the feedback signal 738 and the predetermined level $V_{PRE}$ to generate an error signal 742. The oscillator 712 generates a set signal 730 (e.g., a pulse signal) and a compensation signal $V_C$ (e.g., a saw-tooth wave signal). The adder 710 adds the compensation signal $V_C$ to the error signal 742 to generate a superposition signal 736. The comparator 708 receives the sense signal 384 indicating the current $I_{L3}$ flowing through the inductor L3 at the inverting terminal and receives the superposition signal 736 at the non-inverting terminal. The sense signal 384 may be interfered by noises in the converter 308. The compensation signal $V_C$ is used to compensate the sense signal 384, which is further described in FIG. 7B.

The comparator 708 compares the sense signal 384 to the superposition signal 736 to generate a reset signal 744 according to the result of a comparison. In one embodiment, the PWM generator 714 can be an SR (Set-Reset) latch for generating the driving signal 380. Accordingly, the driving signal 380 is switched to the high electrical level in response to the set signal 730 and is switched to the low electrical level in response to the reset signal 744. The voltage regulator 412 can have other configurations, and is not limited to the example shown in FIG. 7A.

Figure 7B:
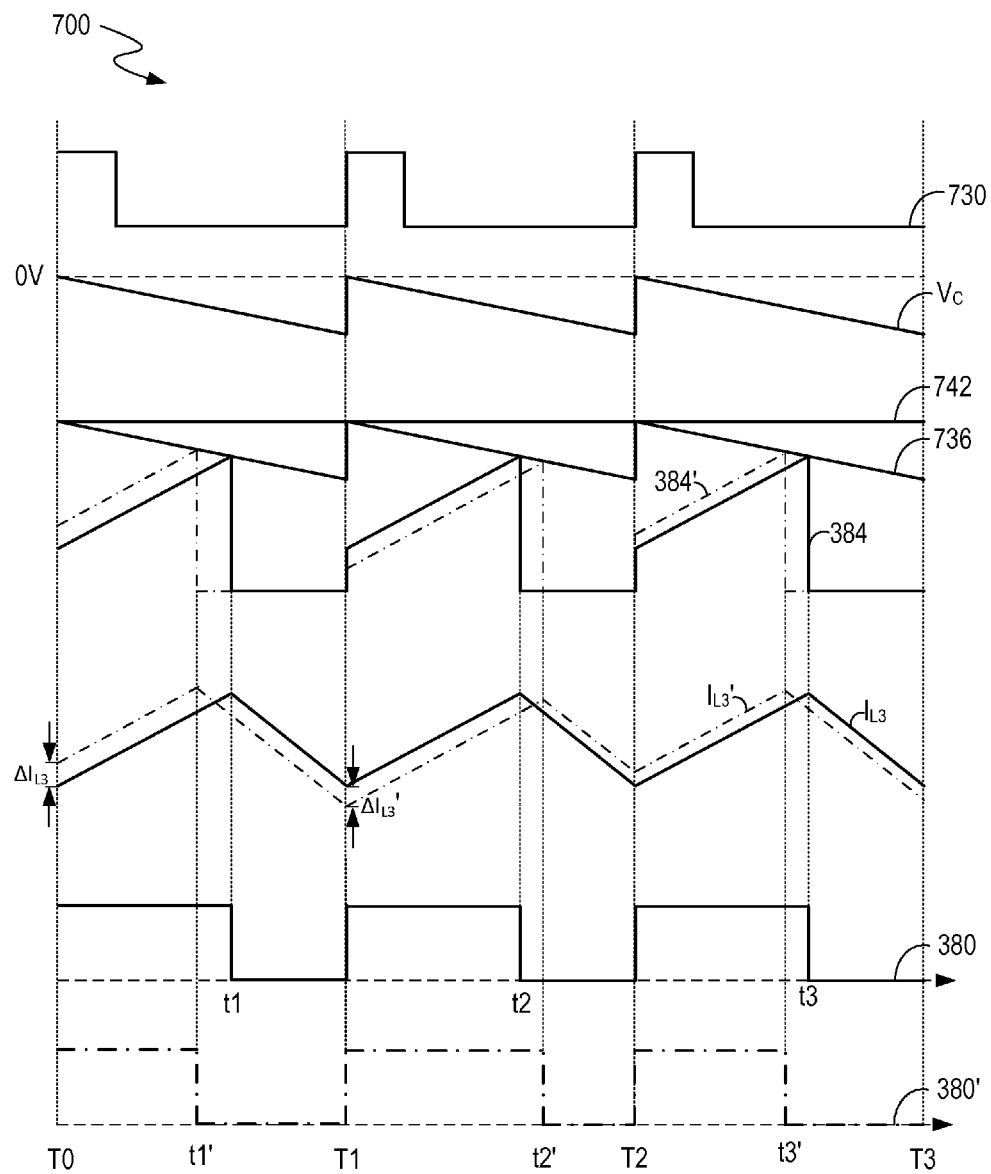
FIG. 7B illustrates an example of a waveform of signals generated or received by a voltage regulator, in accordance with one embodiment of the present invention.

FIG. 7B illustrates an example of a waveform of signals generated or received by the voltage regulator 412, in accordance with one embodiment of the present invention. FIG. 7B is described in combination with FIG. 7A. FIG. 7B shows the set signal 730, the compensation signal $V_C$, the error signal 742, the superposition signal 736, the sense signal 384 in a steady state, the sense signal 384' in a disturbed state, the current $I_{L3}$ in the steady state, the current $I_{L3}'$ in the disturbed state, the driving signal 380 in the steady state, and the driving signal 380' in the disturbed state. In one embodiment, "a steady state" represents a state of the controller 310 when the current $I_{L3}$ is not interfered by the noises, and "a disturbed state" represents a state of the controller 310 when the current $I_{L3}$ is interfered by the noises.

As shown in FIG. 7B, the set signal 730 is a pulse signal having a constant cycle period. As such, when a rising edge of the set signal 730 occurs, the driving signal 380 is switched to a high electrical level, for example, at T1 or T2. The error signal 742 is proportional to a difference between the feedback signal 738 and the predetermined level $V_{PRE}$. Hence, the error signal 742 has a constant level if the difference stays at the same value. The compensation signal $V_C$ is a saw-tooth signal having a same cycle period as the set signal 730. For example, the compensation signal $V_C$ gradually decreases from zero volts during T0 and T1, during T1 and T2, or during T2 and T3. In this instance, the superposition signal 736 decreases from a level equal to the error signal 742 during T0 and T1, during T1 and T2, or during T2 and T3.

When the driving signal 380 is high between T0 and t1, the switch S3 is turned on. The current $I_{L3}$ flowing through the inductor L3 increases. The sense signal 384 is proportional to the current $I_{L3}$, and thus the sense signal 384 increases between T0 and t1. At time t1, the driving signal 380 has a falling edge to turn off the switch S3 when the sense signal 384 reaches the superposition signal 736. When the driving signal 380 is low between t1 and T1, the current $I_{L3}$ flowing through the inductor L3 decreases and the sense signal 384 drops to a predetermined level such as zero volts. During the time interval between T1 and T3, the driving signal 380, the current $I_{L3}$, and the sense signal 384 operate similarly as that during the time interval between T0 and T1.

In one embodiment, the feedback signal 738 determines a duty cycle of the driving signal 380, which further regulates the output voltage $V_{OUT1}$. By way of example, if the feedback signal 738 decreases, e.g., when the current $I_{LED}$ falls below the desired current level $I_{DESIRE}$ or when the out voltage $V_{OUT2}$ falls below the desired voltage level $V_{DESIRE}$, the error signal 742 increases to increase the average level of the superposition signal 736. As such, the sense signal 384 needs more time to reach the superposition signal 736. As the cycle period of the driving signal 380 is constant according to the set signal 730, the duty cycle of the driving signal 380 is increased to increase the output voltage $V_{OUT1}$. As a result, the output voltage $V_{OUT1}$ can satisfy the power needs of both the current $I_{LED}$ and the output voltage $V_{OUT2}$.

In addition, the driving circuit 720 corrects errors of the sense signal 384' in the disturbed state by using the compensation signal $V_C$. As shown in FIG. 7B, if the current $I_{L3}'$ is disturbed by noises at time T0, an error $\Delta I_{L3}$ occurs in the disturbed state. The current $I_{L3}'$ starts to decrease at time t1' which is prior to time t1. As the superposition signal 736 ramps down between time T0 and T1, the error $\Delta I_{L3}'$ between the current $I_{L3}$ and the current $I_{L3}'$ at time T1 becomes smaller than the error $\Delta I_{L3}$ between the current $I_{L3}$ and the current $I_{L3}'$ at time T0. Similarly, the error at time T2 is smaller than the error at time T1, and the error at time T3 is smaller than the error at time T2. Therefore, the error of the sense signal 384' is gradually corrected according to the compensation signal $V_C$.

In one embodiment, the oscillator 712 further receives the reference signal $FRF_F$ indicating a desired value for the maximum frequency $F_{MAX}$ for the driving signal 380. Accordingly, the oscillator 712 controls the frequency of both the set signal 730 and the compensation signal $V_C$ to be less than the maximum frequency $F_{MAX}$, which further controls the frequency of the driving signal 380 below the maximum frequency $F_{MAX}$.

Figure 8:
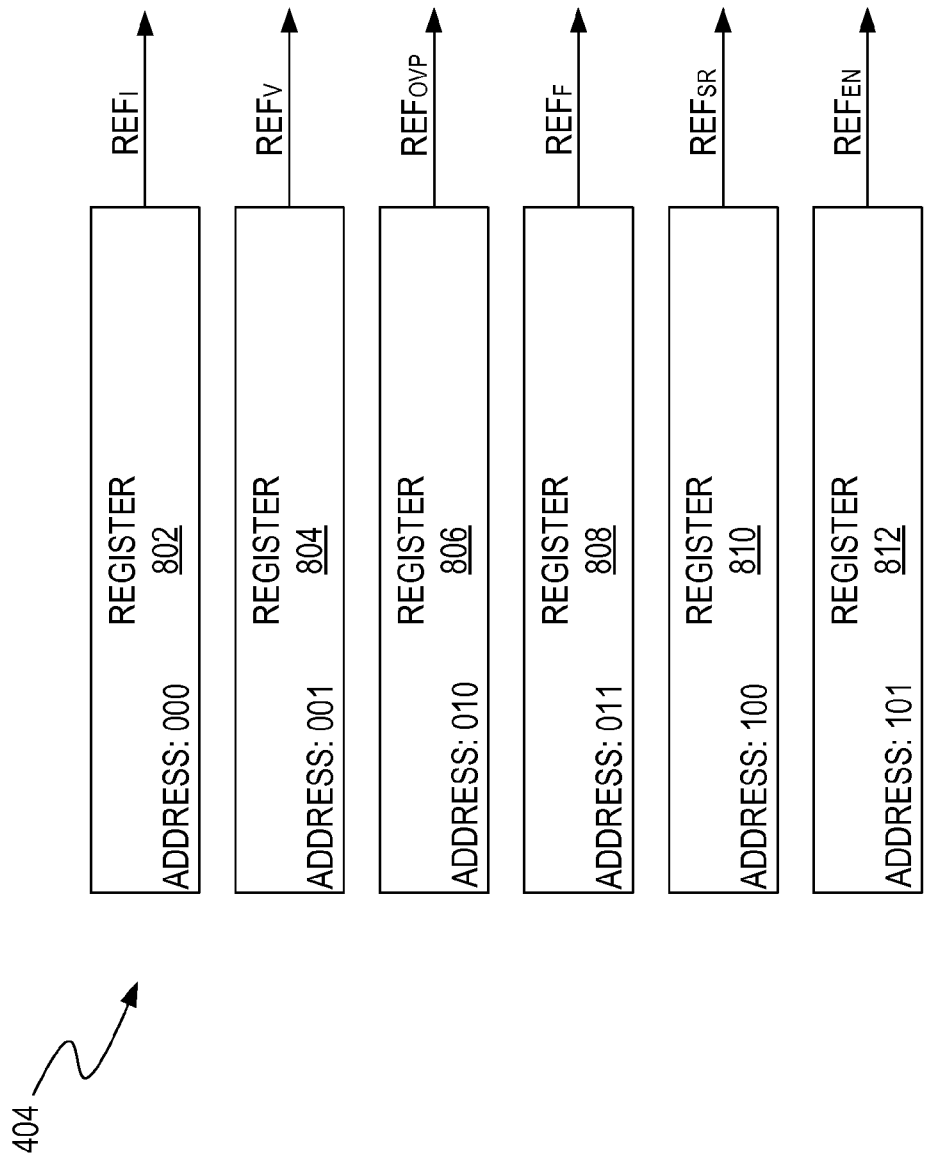
FIG. 8 illustrates an example of a register module, in accordance with one embodiment of the present invention.

FIG. 8 illustrates an example of the register module 404, in accordance with one embodiment of the present invention. Elements labeled the same as in FIG. 4 have similar functions. FIG. 8 is described in combination with FIG. 3 and FIG. 4.

As described in relation to FIG. 3 and FIG. 4, the interface 402 of the controller 310 receives multiple data sets transferred from the single line 370. The data sets can be transferred to the register module 404. In one embodiment, each of the data sets includes an index indicating an address of a corresponding register and includes control data indicating a desired value for a particular signal associated with the controller 310. In one embodiment, the register module 404 stores the control data of a data set to a corresponding register based on the index involved in the same data set, and provides a corresponding reference signal accordingly.

In the example of FIG. 8, the register module 404 includes registers 802, 804, 806, 808, 810 and 812 that have addresses 000, 001, 010, 011, 010 and 011, respectively. The registers 802, 804, 806, 808, 810 and 812 are operable for providing the reference signals $REF_I$, $REF_V$, $REF_{OVP}$, $REF_F$, $REF_{SR}$, and $REF_{EN}$, respectively.

Figure 9:
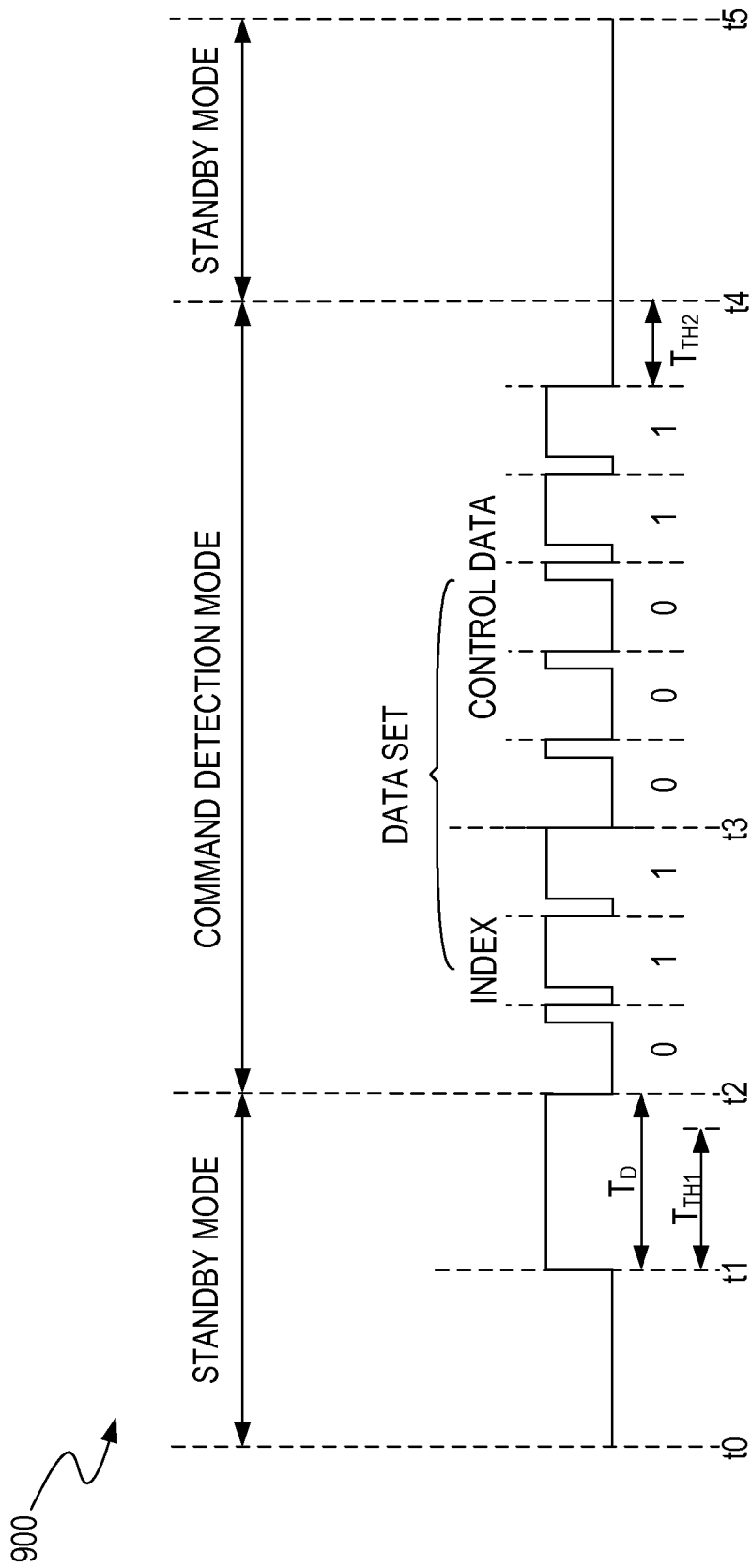
FIG. 9 illustrates an example of the data sets transferred in a display system, in accordance with one embodiment of the present invention.

FIG. 9 illustrates an example 900 of the data sets transferred in the line 370 in the display system 300, in accordance with one embodiment of the present invention. FIG. 9 is described in combination with FIG. 3, FIG. 4 and FIG. 8. FIG. 9 shows how a data set is transferred via the line 370.

In one embodiment, the application processor 306 enables the line 370 to operate in a standby mode and a command detection mode. In the standby mode, no data set is transmitted. In the command detection mode, a data set $D_{370}$ including an index and control data is transferred from the application processor 306 to the register module 404. More specifically, as shown in the example of FIG. 9, at time t0, the line 370 operates in the standby mode, e.g., the voltage at the line 370 is maintained at a low electrical level, and thus no data set is transferred between the application processor 306 and the controller 310. Before switching the line 370 to the command detection mode, the application processor 306 maintains the line 370 in a predetermined state for a time period equal to or greater than a time threshold $T_{TH}$, in order to inform the controller 310 that a data set is ready to be forwarded. In the example of FIG. 9, the voltage on the line 370 is kept at a high electrical level between time t1 and time t2, where the time interval $T_D$ between t1 and t2 is greater than the time threshold $T_{TH}$. Once the voltage at the line 370 drops to a low electrical level at time t2, the line 370 enters the command detection mode in which the data set $D_{370}$ is transferred.

In one embodiment, the data set $D_{370}$ includes multiple digital bits. Each digital bit is represented by a low electrical level followed by a high electrical level on the line 370. In one embodiment, if a time period for the low electrical level is less than a time period for the high electrical level, it indicates that a digital one is transferred. Likewise, if the time period for the low electrical level is greater than the time period for the high electrical level, it indicates that a digital zero is transferred. Hence, in the example of FIG. 9, the data set is 01100011.

In one embodiment, the first three bits of the data set $D_{370}$ represent an index indicating an address of a register and the following multiple bits represent control data associated with the corresponding register. In FIG. 9, the index is 011 and the control data is 00011. Thus, refer to FIG. 8, the register module 404 stores the control data 00011 to the register 808 (e.g., the address of the register 808 is 011).

At time t4, the controller 310 completes transferring the data set. Thus, the line 370 is switched from the command detection mode to the standby mode. In one embodiment, if the data transferring is completed, the line 370 is maintained at a low electrical level. If the line 370 remains at the low level for a time period that reaches a second time threshold $T_{TH2}$, e.g., at time t4, the line 370 enters the standby mode. For example, the $T_{TH2}$ is equal to a cycle period for transferring one data bit). The data set $D_{370}$ can have other number of digital bits or other forms of representations and is further described in relation to FIG. 10.

FIG. 10 illustrates a table diagram 1000 associated with the control data stored in the register module 404, in accordance with one embodiment of the present invention. FIG. 10 is described in combination with FIG. 8 and FIG. 9.

The table diagram 1000 includes columns showing registers, register functions, control data, and corresponding data functions. More specifically, in one embodiment, the register 802 provides the reference signal $REF_I$ indicating the desired current level $I_{DESIRE}$ for the current $I_{LED}$ flowing through the light source 206. In one embodiment, the control data stored in the register 802 have five bits. For example, the control data "00000" means that the desired current level $I_{DESIRE}$ is equal to $I_1$, e.g., $I_{DESIRE}=I_1$; "00001" means that $I_{DESIRE}$ is equal to $I_2$; "00010" means that $I_{DESIRE}$ is equal to $I_3$; and "11111" means that $I_{DESIRE}$ is equal to $I_{32}$. In one embodiment, $I_{32}$ is greater than $I_3$. $I_3$ is greater than $I_2$ which is greater than $I_1$, e.g., $I_{32}>I_3>I_2>I_1$.

The register 804 provides the reference signal $REF_V$ indicating the desired voltage level $V_{DESIRE}$ for the output voltage $V_{OUT2}$. In one embodiment, the control data stored in the register 804 have five bits. For example, the control data "00000" means that the desired voltage level $V_{DESIRE}$ is equal to $V_1$, e.g., $V_{DESIRE}=V_1$; "00001" means that $V_{DESIRE}$ is equal to $V_2$; "00010" means that $V_{DESIRE}$ is equal to $V_3$; and "11111" means that $V_{DESIRE}$ is equal to $V_{32}$. In one embodiment, $V_{32}$ is greater than $V_3$. $V_3$ is greater than $V_2$ which is greater than $V_1$, e.g., $V_{32}>V_3>V_2>V_1$.

The register 806 provides the reference signal $REF_{OVP}$ indicating the voltage protection threshold $V_T$ for the output voltage $V_{OUT1}$. In one embodiment, the control data stored in the register 806 have three bits. For example, the control data "000" means that the voltage protection threshold $V_T$ is equal to $V_{T1}$, e.g., $V_T=V_{T1}$; "001" means that $V_T$ is equal to $V_{T2}$; "010" means that $V_T$ is equal to $V_{T3}$; and "111" means that $V_T$ is equal to $V_{T8}$. In one embodiment, $V_{T8}$ is greater than $V_{T3}$. $V_{T3}$ is greater than $V_{T2}$ which is greater than $V_{T1}$, e.g., $V_{T8}>V_{T3}>V_{T2}>V_{T1}$.

The register 808 provides the reference signal $REF_{FRE}$ indicating the maximum frequency $F_{MAX}$ for the driving signal 380. In one embodiment, the control data stored in the register 808 have five bits. For example, the control data "00000" means that the maximum frequency $F_{MAX}$ is equal to $F_1$, e.g., $F_{MAX}=F_1$; "00001" means that $F_{MAX}$ is equal to $F_2$; "00010" means that $F_{MAX}$ is equal to $F_3$; and "11111" means that $F_{MAX}$ is equal to $F_{32}$. In one embodiment, $F_{32}$ is greater than $F_3$. $F_3$ is greater than $F_2$ which is greater than $F_1$, e.g., $F_{32} > F_3 > F_2 > F_1$.

The register 810 provides the reference signal $REF_{SR}$ indicating the slew rate $SR_{CLKO}$ for the output clock signal CLK_OUT. In one embodiment, the control data stored in the register 810 have one bit. For example, the control data "0" means that the slew rate $SR_{CLKO}$ is equal to $SR_1$, e.g., $SR_{CKLO} = SR_1$; and "1" means that $SR_{CLKO}$ is equal to $SR_2$. In one embodiment, $SR_2$ is greater than $SR_1$, e.g., $SR_2 > SR_1$.

The register 812 provides the reference signal $REF_{EN}$ indicating which of the LED strings are required to be on. In one embodiment, the control data stored in the register 812 have four bits and each bit of the control data corresponds to an LED string. For example, the control data "0000" means that all the LED strings are required to be off; "0001" means that the LED string coupled to the pin ISEN1 is required to be on and the other LED strings are required to be off; "0010" means the LED string coupled to the pin ISEN2 is required to be on and the other LED strings are required to be off; "1111" means that that all the LED strings are required to be on.

Figure 11:
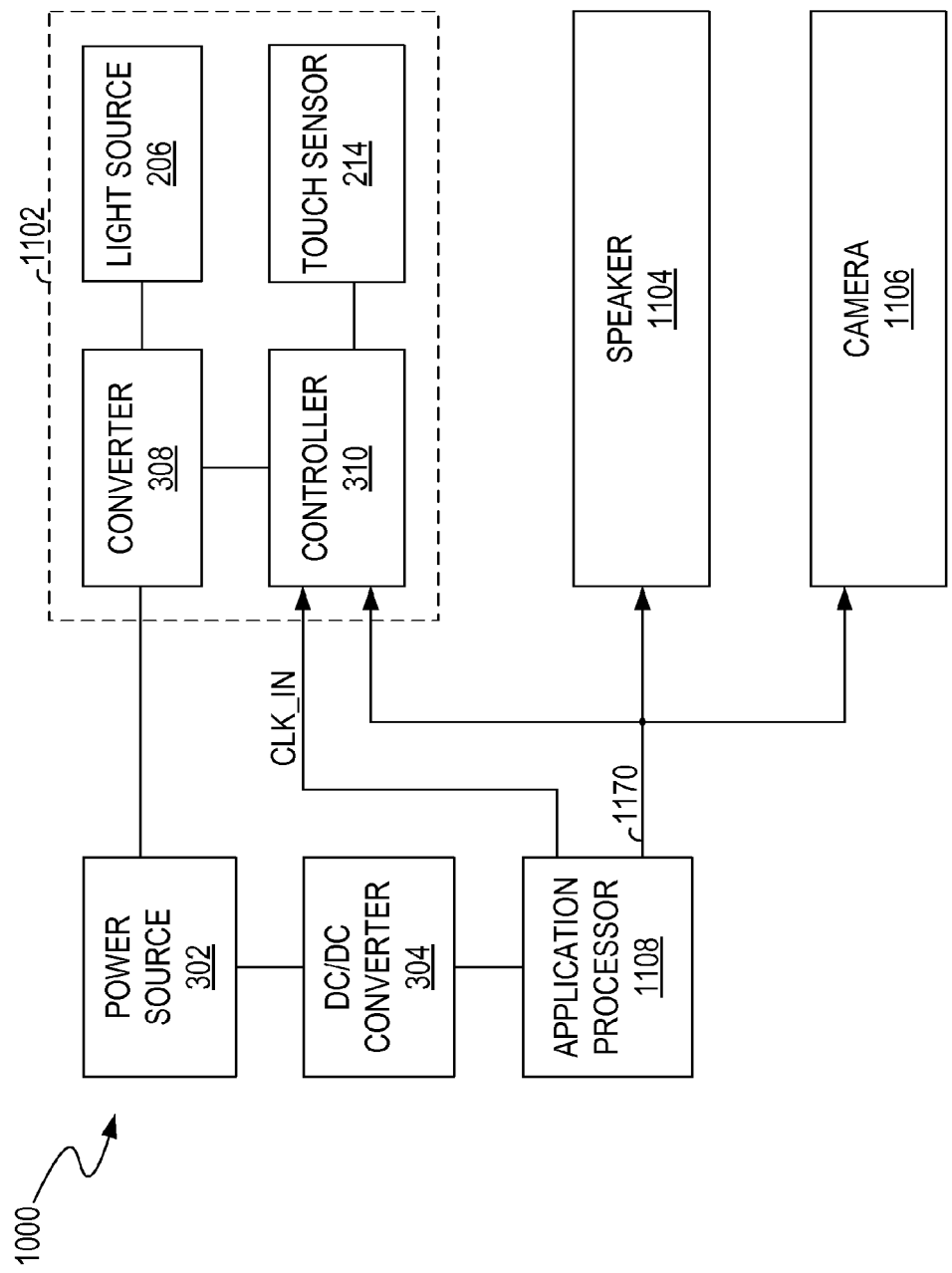
FIG. 11 illustrates a block diagram of an electronic system, in accordance with one embodiment of the present invention.

FIG. 11 illustrates a block diagram of an electronic system 1100, in accordance with one embodiment of the present invention. Elements labeled the same as in FIG. 3 have similar functions. FIG. 11 is described in combination with FIG. 3.

In the example of FIG. 11, the electronic system 1100 includes a power source 302, a DC/DC converter 304, an application processor 1108, a display 1102, a speaker 1104 and a camera 1106. The display 1102 includes a converter 308, a controller 310, a light source 206, and a touch screen having touch sensors 214, and operates similarly as corresponding components in the display system 300. In one embodiment, the display 1102, the speaker 1104 and the camera 1106 are all coupled to the application processor 1108 through a single line 1170. The application processor 1108 generates multiple data sets $D_{1170}$ on the line 1170 to control the display 1102, the speaker 1104, and the camera 1106. In one embodiment, the display 1102, the speaker 1104 and the camera 1106 all operate in accordance with the same communication protocol standard, which is further described in relation to FIG. 12.

Figure 12:
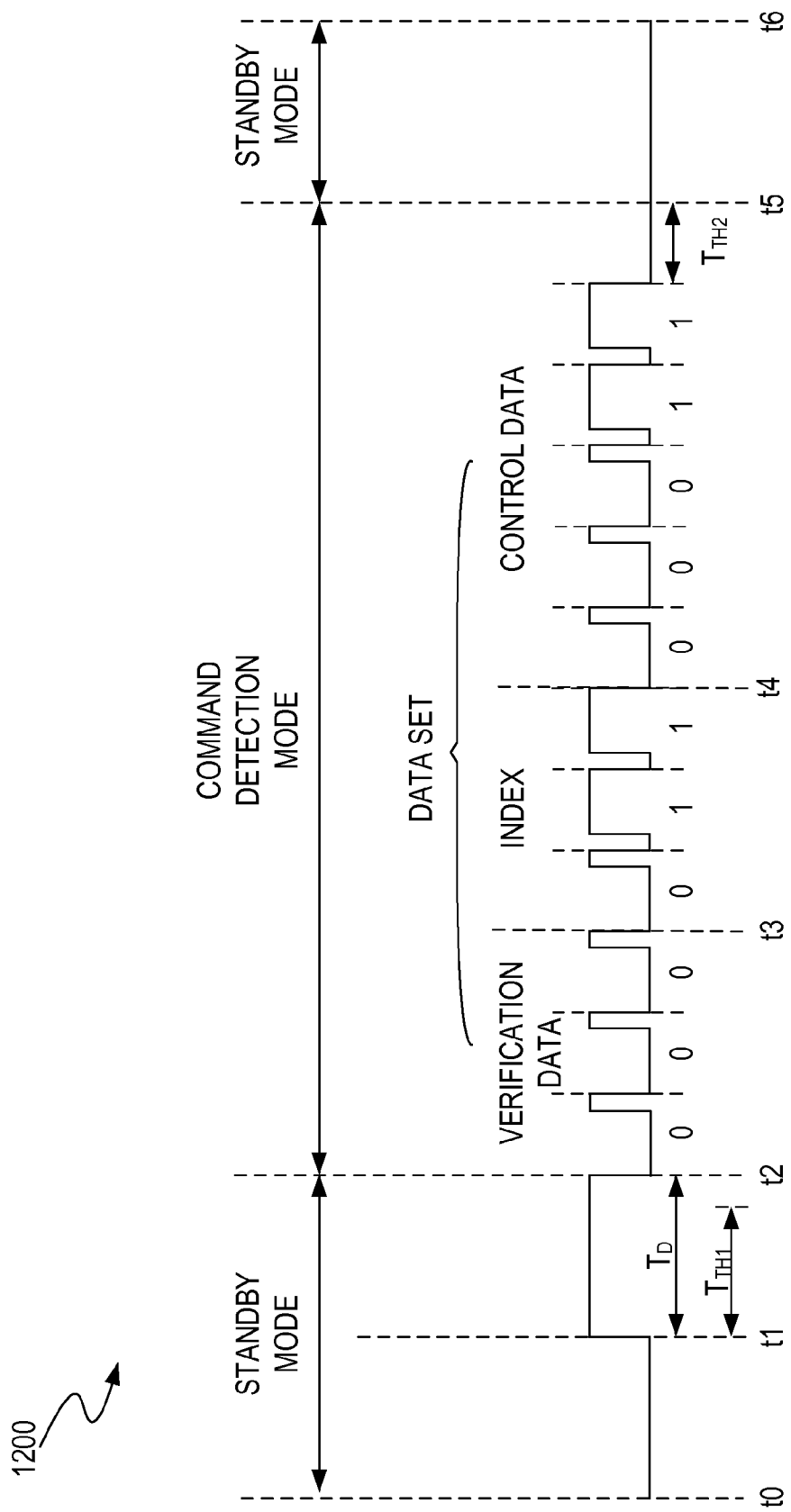
FIG. 12 illustrates an example of the data sets transferred in an electronic system, in accordance with one embodiment of the present invention.

FIG. 12 illustrates an example 1200 of a data set $D_{1170}$ transferred through the line 1170 in the display system 1100, in accordance with one embodiment of the present invention. FIG. 12 is described in combination with FIG. 9 and FIG. 11.

The data set $D_{1170}$ transferred through the line 1170 is similar to the data set $D_{370}$ transferred through the line 370 in FIG. 3. For example, the data set $D_{1170}$ includes an index and control data. Moreover, the data set $D_{1170}$ includes verification data indicating an identity of an electronic device in the electronic system 1100. For example, if the verification data is 000, 001 and 010, it indicates an identity of the display 1102, the speaker 1104 and the camera 1106, respectively. In one embodiment, each of the display 1102, the speaker 1104 and the camera 1106 receives the data set $D_{1170}$, and identifies the verification data to determine whether to accept the data set $D_{1170}$.

By way of example, the controller 310 compares the verification data with an identification data stored in the controller 310. If an identity of the controller matches to the verification data, the controller 310 stored the control data to the corresponding register. If no matching is found between the identity of the controller and the verification data, the controller discards the data set. In the example of FIG. 12, the verification data is 000, the index is 011, and the control data is 00011. Thus, the controller 310 (the controller 310 has an address: 011) stores the control data 00011 to the register 808.

The speaker 1104 and the camera 1106 discard the control data because the verification data does not match to the identification data stored in either the speaker 1104 or the camera 1106.

Advantageously, by using the single line 1170, all the display 1102, the speaker 1104 and the camera 1106 can receive the data sets from the application processor 1108. Therefore, the electronic system 1100 is simplified and the cost of the electronic system 1100 is reduced.

Figure 13:
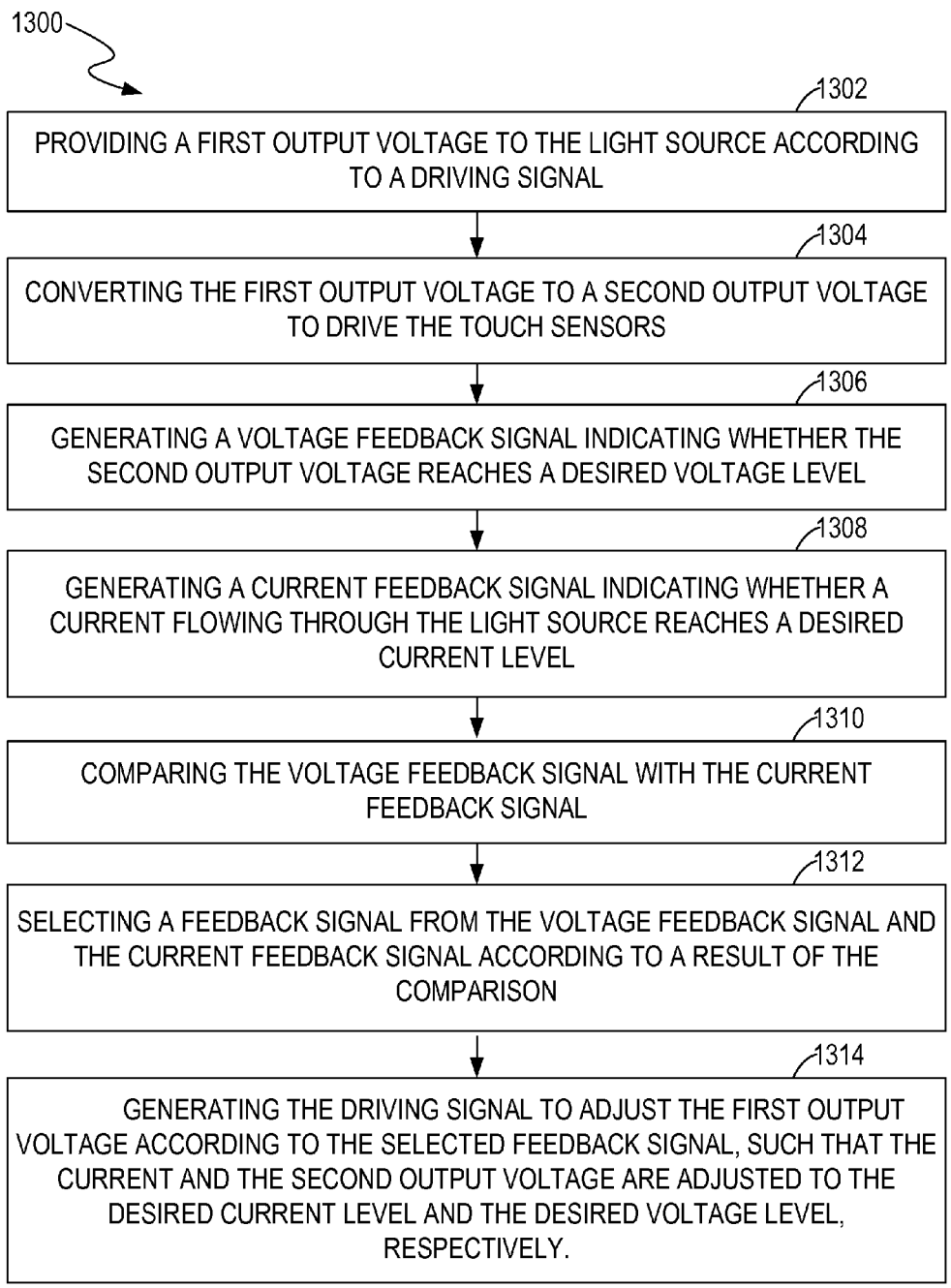
FIG. 13 illustrates a flowchart of operations performed by a display system, in accordance with one embodiment of the present invention.

FIG. 13 illustrates a flow chart 1300 of operation performed by a display system, e.g., the display system 300, in accordance with one embodiment of the present invention. FIG. 13 is described in combination with FIG. 2-FIG. 12. Although specific steps are disclosed in FIG. 13, such steps are examples. That is, the present invention is well suited to performing various other steps of variations of the steps recited in FIG. 13.

In block 1302, a first output voltage, e.g., the voltage $V_{OUT1}$, is provided to the light source, e.g., the light source 206, according to a driving signal, e.g., the driving signal 380. In one embodiment, a current, e.g., the current $I_{LED}$, flowing through the light source is adjusted to a desired current level, e.g., the level $I_{DESIRE}$, if the first output voltage is greater than a voltage threshold, e.g., the voltage VTH1.

In block 1304, the first output voltage is converted to a second output voltage, e.g., the voltage $V_{OUT2}$. In one embodiment, the second output voltage is adjusted to a desired voltage level, e.g., the level $V_{DESIRE}$, if a difference between the first output voltage and the second output voltage is greater than a voltage threshold, e.g., the voltage VTH2. In one embodiment, multiple data sets are transferred through a single line, e.g., the line 370. The data sets include a first data set indicating the desired voltage level for the second output voltage and a second data set indicating the desired current level for the current flowing through the light source.

In block 1306, a voltage feedback signal, e.g., the signal LDOFB, indicating whether the second output voltage reaches the desired voltage level is generated. In one embodiment, the voltage feedback signal is proportional to a difference between the first output voltage and the second output voltage. The voltage feedback signal is greater than a predetermined level, e.g., the level $V_{PRE}$, if the second output voltage reaches the desired voltage level, and is less than the predetermined level if the second output voltage is less than the desired voltage level.

In block 1308, a current feedback signal, e.g., the signal LEDFB, indicating whether the current flowing through the light source reaches a desired current level is generated. In one embodiment, the current feedback signal is proportional to the current flowing through the light source. The current feedback signal is equal to a predetermined level, e.g., the level $V_{PRE}$, if the current flowing through the light source reaches the desired current level, and is less than the predetermined level if the current is less than the desired current level.

In block 1310, the voltage feedback signal and the current feedback signal are compared. In block 1312, a feedback signal, e.g., the signal 738, is selected from the voltage feedback signal and the current feedback signal according to a result of the comparison. In block 1314, the driving signal is generated to adjust the first output voltage according to the selected feedback signal, such that the current and the second output voltage are adjusted to the desired current level and the desired voltage level, respectively.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. a display system comprising:
    a touch screen comprising a plurality of touch sensors and a light source that backlights a display panel; and
    a driving circuit coupled to said touch screen, said driving circuit comprising:
        a converter that receives an input voltage generated by a power source, and that provides a first output voltage to said light source according to a driving signal; and
        a controller, coupled to said converter, that converts said first output voltage to a second output voltage to drive said touch sensors, that generates a voltage feedback signal indicating whether said second output voltage reaches a desired voltage level, and that generates a current feedback signal indicating whether a current flowing through said light source reaches a desired current level, wherein said controller compares said voltage feedback signal with said current feedback signal and selects a feedback signal from said voltage feedback signal and said current feedback signal according to a result of said comparison, wherein said controller generates said driving signal to adjust said first output voltage according to said selected feedback signal, such that said current and said second output voltage are adjusted to said desired current level and said desired voltage level, respectively.

2. The display system as claimed in claim 1, wherein said controller comprises:
    a voltage control circuit that receives said first output voltage, that adjusts said second output voltage to said desired voltage level if a difference between said first output voltage and said second output voltage is greater than a voltage threshold.

3. The display system as claimed in claim 1, wherein said controller comprises:
    a feedback circuit that generates said voltage feedback signal proportional to a difference between said first output voltage and said second output voltage.

4. The display system as claimed in claim 1, wherein said voltage feedback signal is greater than a predetermined level if said second output voltage reaches said desired voltage level, and wherein said voltage feedback signal is less than said predetermined level if said second output voltage is less than said desired voltage level.

5. The display system as claimed in claim 1, wherein said controller comprises:
    a current control circuit that adjusts said current through said light source to said desired current level if said first output voltage is greater than a voltage threshold.

6. The display system as claimed in claim 1, wherein said controller comprises:
    a feedback circuit that generates said current feedback signal proportional to said current flowing said light source.

7. The display system as claimed in claim 1, wherein said light source comprises a plurality of light source strings, and wherein said controller comprises:
    a feedback circuit that generates said current feedback signal proportional to a minimum current of a plurality of currents flowing said light source strings.

8. The display system as claimed in claim 1, wherein said current feedback signal is equal to a predetermined level if said current through said light source reaches said desired current level, and wherein said current feedback signal is less than said predetermined level if said current is less than said desired current level.

9. The display system as claimed in claim 1, wherein said controller further comprises:
    a level shifter that receives an input clock signal and that provides an output clock signal to said touch sensors based on said second output voltage,
    wherein said level shifter further receives a reference signal indicating a desired value for a slew rate of said output clock signal, and wherein said level shifter adjusts the slew rate of said output clock signal to said desired value according to said reference signal.

10. The display system as claimed in claim 1, further comprising:
    an application processor, coupled to said controller, that transfers a plurality of data sets to said controller through a single line, wherein said data sets comprise a first data set indicating said desired voltage level for said second output voltage and a second data set indicating said desired current level for said current through said light source.

11. The display system as claimed in claim 10, wherein said controller comprises:
    a plurality of registers coupled to said line, wherein a data set of said data sets comprises an index indicating an address of a corresponding register of said plurality of registers, and wherein said controller stores said data set to said corresponding register according to said index.

12. The display system as claimed in claim 10, wherein said application processor maintains said line in a predetermined state for a time period greater than a time threshold before transferring said data set to said controller.

13. The display system as claimed in claim 10, wherein said data sets transferred through said line comprise a third data set indicating a voltage protection threshold, and wherein said controller further comprises a voltage protection circuit that terminates operations of said controller according to said third data set.

14. The display system as claimed in claim 10, wherein said driving signal is a periodical signal, wherein said data sets transferred through said line comprise a third data set indicating a predetermined maximum frequency of said driving signal, and wherein a voltage regulator maintains the frequency of said driving signal below said predetermined maximum frequency according to said third data set.

15. The display system as claimed in claim 10, wherein said light source comprises a plurality of light source strings, wherein said data sets transferred through said line comprise a third data set indicating which of said light source strings are required to be on, and wherein said controller enables and disables said light source strings according to said third data set.

16. The display system as claimed in claim 10, wherein said data set comprises verification data indicating an identity of a target device, wherein said controller compares said verification data with an identification data stored in said controller, accepts said data set if said verification data matches to said identification data, and discards said data set if no matching is found between said verification data and said identification data.

17. A method for controlling a touch screen, wherein said touch screen comprises a plurality of touch sensors and a light source that backlights said touch screen, and wherein said method comprises:
providing a first output voltage to said light source according to a driving signal;
converting said first output voltage to a second output voltage to drive said touch sensors;
generating a voltage feedback signal indicating whether said second output voltage reaches a desired voltage level;
generating a current feedback signal indicating whether a current flowing through said light source reaches a desired current level;
comparing said voltage feedback signal with said current feedback signal;
selecting a feedback signal from said voltage feedback signal and said current feedback signal according to a result of said comparison; and
generating said driving signal to adjust said first output voltage according to said selected feedback signal, such that said current and said second output voltage are adjusted to said desired current level and said desired voltage level, respectively.

18. The method as claimed in claim 17, further comprising:
adjusting said second output voltage to said desired voltage level if a difference between said first output voltage and said second output voltage is greater than a voltage threshold.

19. The method as claimed in claim 17, further comprising:
generating said voltage feedback signal proportional to a difference between said first output voltage and said second output voltage, wherein said voltage feedback signal is greater than a predetermined level if said second output voltage reaches said desired voltage level, and wherein said voltage feedback signal is less than said predetermined level if said second output voltage is less than said desired voltage level.

20. The method as claimed in claim 17, further comprising:
adjusting said current through said light source to said desired current level if said first output voltage is greater than a voltage threshold.

21. The method as claimed in claim 17, further comprising:
generating said current feedback signal proportional to said current through said light source, wherein said current feedback signal is equal to a predetermined level if said current through said light source reaches said desired current level, and wherein said current feedback signal is less than said predetermined level if said current is less than said desired current level.

22. The method as claimed in claim 17, further comprising:
transferring a plurality of data sets through a single line, wherein said data sets comprise a first data set indicating said desired voltage level for said second output voltage and a second data set indicating said desired current level for said current through said light source.

23. A controller for controlling a touch screen, wherein said touch screen comprises a plurality of touch sensors and a light source that backlights said touch screen, and wherein said controller comprises:
a voltage control circuit that receives a first voltage for powering said light source, that generates a second voltage according to said first voltage to drive said touch sensors, and that generates a voltage feedback signal indicating whether said second voltage is adjusted to a desired voltage level;
a current control circuit that monitors a current flowing through said light source, and that generates a current feedback signal indicating whether said current is adjusted to a desired current level; and
a voltage regulator, coupled to said voltage control circuit and said current control circuit, that compares said voltage feedback signal and said current feedback signal, that selects a feedback signal from said voltage feedback signal and said current feedback signal according to a result of the comparison, and that generates a driving signal according to said selected feedback signal to regulate said first voltage, such that said current and said second voltage are adjusted to said desired current level and said desired voltage level, respectively.

24. The controller as claimed in claim 23, wherein said voltage control circuit comprises a first feedback circuit that generates said voltage feedback signal proportional to a difference between said first voltage and said second voltage, and wherein said current control circuit comprises a second feedback circuit that generates said current feedback signal proportional to said current through said light source.

25. The controller as claimed in claim 23, wherein said voltage control circuit adjusts said second voltage to said desired voltage level if said first voltage is greater than a first voltage threshold, and wherein said current control circuit adjusts said current through said light source to said desired current level if said first voltage is greater than a second voltage threshold.

26. The controller as claimed in claim 23, wherein said voltage feedback signal is selected if said voltage feedback signal is less than said current feedback signal, and wherein said current feedback signal is selected if said voltage feedback signal is greater than said current feedback signal.

27. The controller as claimed in claim 23, wherein said controller further comprising:
an interface, coupled to a single line, that receives a plurality of data sets from said single line, wherein said data sets comprise a first data set indicating said desired voltage level for said second voltage and a second data set indicating said desired current level for said current through said light source.

28. The controller as claimed in claim 27, wherein said controller further comprising:
a plurality of registers, wherein each of said data set comprises an index indicating an address of a corresponding register of said plurality of registers, and wherein said controller stores said data set to said corresponding register according to said index.

29. The controller as claimed in claim 27, wherein said interface identifies that a data transfer is to be initiated if said line is maintained at a high electrical level for a time period greater than a first time threshold, and wherein said interface identifies that said data transfer is completed if said line is maintained at a low electrical level for a time period greater than a second time threshold.

30. The controller as claimed in claim 27, wherein said controller further comprises:
a level shifter that receives an input clock signal and that generates an output clock signal based on said second voltage,
wherein said data sets transferred through said line comprise a third data set indicating a desired value for a slew rate of said output clock signal, and wherein said level shifter adjusts the slew rate of said output clock signal to said desired value according to said third data set.

31. The controller as claimed in claim 27, wherein said data sets transferred through said line comprise a third data set indicating a voltage protection threshold, and wherein said controller further comprises a voltage protection circuit that terminates operation of said controller according to said third data set.

32. The controller as claimed in claim 27, wherein said driving signal is a periodical signal, wherein said data sets transferred through said line comprise a third data set indicating a predetermined maximum frequency of said driving signal, and wherein said voltage regulator maintains the frequency of said driving signal below said predetermined maximum frequency according to said third data set.

33. The controller as claimed in claim 27, wherein said light source comprises a plurality of light source strings, wherein said data sets transferred through said line comprise a third data set indicating which of said light source strings are required to be on, and wherein said controller enables and disables said light source strings according to said third data set.

* * * * *